(12) United States Patent
Aratani

(10) Patent No.: US 10,839,544 B2
(45) Date of Patent: Nov. 17, 2020

(54) INFORMATION PROCESSING APPARATUS, INFORMATION PROCESSING METHOD, AND NON-TRANSITORY COMPUTER READABLE STORAGE MEDIUM

(71) Applicant: CANON KABUSHIKI KAISHA, Tokyo (JP)

(72) Inventor: Shinichi Aratani, Kawasaki (JP)

(73) Assignee: CANON KABUSHIKI KAISH, Tokyo (JP)

( * ) Notice: Subject to any disclaimer, the term of this patent is extended or adjusted under 35 U.S.C. 154(b) by 247 days.

(21) Appl. No.: 15/354,002

(22) Filed: Nov. 17, 2016

(65) Prior Publication Data
US 2017/0148167 A1 May 25, 2017

(30) Foreign Application Priority Data
Nov. 20, 2015 (JP) .................................. 2015-228094

(51) Int. Cl.
*G06T 7/60* (2017.01)
*G06T 7/73* (2017.01)

(52) U.S. Cl.
CPC .................. *G06T 7/60* (2013.01); *G06T 7/73* (2017.01); *G06T 2207/10004* (2013.01); *G06T 2207/10016* (2013.01); *G06T 2207/30244* (2013.01)

(58) Field of Classification Search
CPC ... G06T 7/73; G06T 2207/30244; G06T 7/80; G06T 19/00; G06T 7/60; G06K 9/3216; G06K 2009/3225
See application file for complete search history.

(56) References Cited

U.S. PATENT DOCUMENTS

| 8,913,821 B1* | 12/2014 | Agarwal | G06T 7/55 |
| | | | 382/154 |
| 9,003,423 B1* | 4/2015 | Rodriguez Valadez | |
| | | | G06F 9/542 |
| | | | 719/310 |

(Continued)

FOREIGN PATENT DOCUMENTS

| JP | 2003266345 A | 9/2003 |
| JP | 2010079869 A | 4/2010 |

OTHER PUBLICATIONS

Haralick BM, Lee CN, Ottenberg K, Nölle M. Review and analysis of solutions of the three point perspective pose estimation problem. International journal of computer vision. Dec. 1, 1994;13(3):331-56. (Year: 1994).*

Lowe DG. Fitting parameterized three-dimensional models to images. IEEE Transactions on Pattern Analysis & Machine Intelligence. May 1, 1991(5):441-50. (Year: 1991).*

Bruno Raffin. High Performance Interactive Computing. Computer Science [cs]. Institut National Polytechnique de Grenoble—INPG, 2009. <tel-00550836> (Year: 2010).*

(Continued)

*Primary Examiner* — Clifford Hilaire
(74) *Attorney, Agent, or Firm* — Carter, DeLuca & Farrell LLP

(57) ABSTRACT

Position/orientation information that indicates the position and orientation of an image sensing device is estimated on the basis of three-dimensional position information of a registered feature and a feature in a frame image captured by the image sensing device. Three-dimensional position information of an unregistered feature is generated on the basis of the estimated position/orientation information, and the generated three-dimensional position information is registered. The generation and registration of the three-dimensional position information of the unregistered feature are controlled in accordance with execution of the estimation.

22 Claims, 13 Drawing Sheets

(56) References Cited

U.S. PATENT DOCUMENTS

| | | | | |
|---|---|---|---|---|
| 2005/0256395 | A1* | 11/2005 | Anabuki | G06T 7/80 600/414 |
| 2007/0167801 | A1* | 7/2007 | Webler | G06T 19/00 600/459 |
| 2008/0256474 | A1* | 10/2008 | Chakra | G06F 3/0481 715/772 |
| 2014/0333667 | A1* | 11/2014 | Jung | G06T 11/00 345/633 |
| 2015/0332506 | A1 | 11/2015 | Aratani | |
| 2017/0069138 | A1 | 3/2017 | Aratani | |
| 2017/0103509 | A1* | 4/2017 | Scharfenberger | H04N 9/3185 |

OTHER PUBLICATIONS

Klein, G., et al., "Parallel Tracking and Mapping for Small AR Workspaces", Active Vision Laboratory, Department of Engineering Science, University of Oxford, In: Intl. Symp. on Mixed and Augmented Reality (ISMAR), 2007, 10 pages.

Engel, J. et al., "LSD-SLAM: Large-Scale Direct Monocular SLAM", Technical University Munich, European Conference on Computer Vision (ECCV), 2014, 16 pages.

Notice of Reasons for Refusal dated Oct. 25, 2019 by the Japanese Patent Office in corresponding Japanese Patent Application No. 2015-228094 with English translation.

* cited by examiner

INFORMATION PROCESSING APPARATUS, INFORMATION PROCESSING METHOD, AND NON-TRANSITORY COMPUTER READABLE STORAGE MEDIUM

BACKGROUND OF THE INVENTION

Field of the Invention

The present invention relates to a technique to estimate the position and orientation of an image sensing device.

Description of the Related Art

Mixed reality (MR) techniques and augmented reality (AR) techniques are known as techniques to merge a physical world and a virtual world in real time. These techniques merge a physical space and a computer-generated virtual space seamlessly. Applications of these techniques are expected in various fields; for example, these techniques may assist assembly work by displaying work procedures and a wiring status as superimposed images, and assist surgery by displaying an internal status of a patient's body as a superimposed image over the surface of the patient's body.

One of the huge challenges to overcome in realizing the MR techniques is position matching. In order for a user to feel that a virtual object actually exists in a physical space, it is necessary to achieve geometric consistency between the virtual object and the physical space. That is to say, the user should always perceive that the virtual object exists at the position where the virtual object is supposed to exist in the physical space.

One of the apparatuses that enable an observer to feel as if a virtual object actually exists in a physical space is a video see-through information processing apparatus. This apparatus captures images of a physical world using a video camera, generates composite images by superimposing a virtual object over the captured images, and presents the composite images to an observer by displaying the composite images on a display unit of a display device or the like in real time. Such an information processing apparatus is typically a mobile information terminal called a tablet terminal with a video camera mounted on the back, a video see-through head-mounted display (HMD) that is worn on a head, and the like.

Generally, in the case of MR that utilizes a video see-through HMD, each time an image is input from a camera built in the HMD, the position and orientation of the camera in a physical space at the time of image capture are measured. Then, computer graphics (CG) are rendered on the basis of the position and orientation of the camera and camera-specific parameters, such as a focal length, and superimposed over the captured image of the physical space. Therefore, in the case of MR that utilizes a video see-through HMD, the challenge of position matching involves measurement of the position and orientation of a camera built in the HMD in a physical space.

The position and orientation of a camera can be measured using a physical sensor with six degrees of freedom, such as a magnetic sensor, an ultrasound sensor, and an optical sensor. Meanwhile, when a video see-through HMD is used, image information from a camera built in the video see-through HMD can be utilized in position matching. A position matching method that utilizes image information is widely used because it is simple and low-cost compared with a method that utilizes a physical sensor. With the position matching method that utilizes image information, a camera captures an image of an index whose three-dimensional position in a physical space is known, and the position and orientation of the camera are estimated on the basis of correspondence between the position of the index in the captured image and the three-dimensional position of the index. For instance, an index that is artificially placed in a physical space is known. Examples of such an index include a quadrilateral marker, a circular marker, and a point marker. However, placing a large number of indices in a physical environment is problematic, because it requires a high cost in terms of human resources and time and impairs scenery.

This problem has led to the use of a technique to detect a natural feature, such as an edge and an angular point with a luminance gradient, from a captured image without using a known index, and estimate the position and orientation of a camera on the basis of the detected natural feature.

According to a technique described in Non-Patent Literature 1 (Klein, G., Murray, D.: Parallel tracking and mapping for small AR workspaces. In: Intl. Symp. on Mixed and Augmented Reality (ISMAR), 2007), feature points are detected from images as natural features. As a camera moves, a feature point detected from an initial image is two-dimensionally tracked, and 8×8 pixel patches around the feature points in two images, that is to say, the initial image and the current image, are associated with each other. The relative positions and orientations of the camera that captured the two images and the positions serving as three-dimensional information of sets of associated feature points are estimated from associated image coordinates. In Non-Patent Literature 1, the positions serving as three-dimensional information of sets of feature points and image patches around these positions are collectively referred to as a map. Furthermore, a map calculated from the first two images is referred to as an initial map. The calculated map (here, sets of feature points with three-dimensional position information) is projected onto an image surface on the basis of the current position and orientation of the camera, and the position and orientation of the camera are updated so as to minimize errors between the detected feature points and the projected feature points. When the position and orientation of the camera and sufficient feature points have been estimated, images called keyframes are acquired from a video. Feature points detected from the keyframes are searched for on an epipolar line, and association is made. Bundle adjustment is applied to the positions and orientations of the camera for the keyframes and the three-dimensional positions of sets of feature points to minimize projection errors in the keyframes, and nonlinear optimization calculation is performed to achieve high-precision calculation of the map. Furthermore, in Non-Patent Literature 1, mapping is started upon manual input, such as input via a mouse or input performed by touching a screen. After mapping has been started, map generation processing is continued in parallel with the estimation of the position and orientation of the camera.

In Non-Patent Literature 2 (LSD-SLAM: Large-Scale Direct Monocular SLAM, J. Engel, T. Schops, D. Cremers, European Conference on Computer Vision (ECCV), 2014), sets of points with a luminance gradient is finely detected from an entire image as natural features. An initial map is generated using a method similar to the method described in Non-Patent Literature 1. After the initial map has been generated, the position and orientation are updated so that, when map points are projected onto the current image, luminance values of the map points in keyframes match luminance values of the map points in the current frame. The next keyframe is added when the position has changed by a threshold or more since the previous keyframe. Epipolar search for map points in a nearby keyframe is performed using the added keyframe, association is made, and depth information of the map points in the current keyframe is estimated on the basis of the relative positions and orientations for the two keyframes and association information. In Non-Patent Literature 2, image information of the keyframes, depth information of points with a luminance gradient in the keyframes, and the positions and orientations for the keyframes are collectively referred to as a map. Along with successive addition of the keyframes, errors are accumulated, and thus map optimization is performed to ensure consistency of the map as a whole.

The techniques described in Non-Patent Literature 1 and Non-Patent Literature 2 are called simultaneous localization and mapping (SLAM). These are the methods in which localization for estimating the self-position and orientation of a camera, and mapping for estimating the positions of feature points, are simultaneously performed.

As with Non-Patent Literature 1 and Non-Patent Literature 2, these methods of simultaneously performing the estimation of the position and orientation of a camera and the map estimation have the risk of overflow when the upper limit of a memory is reached due to continuation of the map generation. These methods may also give rise to the problem that, with an increase in the amount of information, the processing load increases and the frame rate drops, among other problems. In view of this, the following method may be used instead of simultaneously performing the map generation and the estimation of the position and orientation of a camera at any time: the map generation and the estimation of the position and orientation of the camera are simultaneously performed until a certain point at which the map generation is stopped, and then the estimation of the position and orientation of the camera is performed using the map that has been generated by then. However, this method gives rise to the problem that a user who is not specialized in or does not have previous knowledge in the techniques to estimate the position and orientation of the camera does not know when to start, stop, or resume the map generation.

SUMMARY OF THE INVENTION

The present invention has been made in view of this problem, and provides a technique to enable a user to generate three-dimensional position information of features used in the estimation of the position and orientation of an image sensing device with the use of a smaller memory, even if the user does not have specialized knowledge in the pertinent art.

According to the first aspect of the present invention, there is provided an information processing apparatus, comprising: an estimation unit configured to estimate position/orientation information on the basis of three-dimensional position information of a registered feature and a feature in a frame image captured by an image sensing device, the position/orientation information indicating a position and an orientation of the image sensing device; and a generation unit configured to generate three-dimensional position information of an unregistered feature on the basis of the position/orientation information estimated by the estimation unit, and register the generated three-dimensional position information, wherein the generation unit controls the generation and the registration of the three-dimensional position information of the unregistered feature in accordance with execution of the estimation.

According to the second aspect of the present invention, there is provided an information processing apparatus, comprising: an acquisition unit configured to acquire an image captured by an image sensing device; an estimation unit configured to estimate position/orientation information on the basis of a feature whose three-dimensional position information has been registered and a feature included in the captured image, the position/orientation information indicating a position and an orientation of the image sensing device; a registration unit configured to register three-dimensional position information of an unregistered feature included in the captured image on the basis of the position/orientation information; and a notification unit configured to notify a user of a progress of the registration of the three-dimensional position information of the unregistered feature executed by the registration unit.

According to the third aspect of the present invention, there is provided an information processing method executed by an information processing apparatus, the information processing method comprising: estimating position/orientation information on the basis of three-dimensional position information of a registered feature and a feature in a frame image captured by an image sensing device, the position/orientation information indicating a position and an orientation of the image sensing device; generating three-dimensional position information of an unregistered feature on the basis of the estimated position/orientation information, and registering the generated three-dimensional position information; and controlling the generation and the registration of the three-dimensional position information of the unregistered feature in accordance with execution of the estimation.

According to the fourth aspect of the present invention, there is provided an information processing method, comprising: acquiring an image captured by an image sensing device; estimating position/orientation information on the basis of a feature whose three-dimensional position information has been registered and a feature included in the captured image, the position/orientation information indicating a position and an orientation of the image sensing device; registering three-dimensional position information of an unregistered feature included in the captured image on the basis of the position/orientation information; and notifying a user of a progress of the registration of the three-dimensional position information of the unregistered feature.

According to the fifth aspect of the present invention, there is provided a non-transitory computer readable storage medium storing a computer program for causing a computer to function as: an estimation unit configured to estimate position/orientation information on the basis of three-dimensional position information of a registered feature and a feature in a frame image captured by an image sensing device, the position/orientation information indicating a position and an orientation of the image sensing device; and a generation unit configured to generate three-dimensional position information of an unregistered feature on the basis of the position/orientation information estimated by the estimation unit, and register the generated three-dimensional position information, wherein the generation unit controls the generation and the registration of the three-dimensional position information of the unregistered feature in accordance with execution of the estimation.

According to the sixth aspect of the present invention, there is provided a non-transitory computer readable storage medium storing a computer program for causing a computer to function as: an acquisition unit configured to acquire an image captured by an image sensing device; an estimation unit configured to estimate position/orientation information on the basis of a feature whose three-dimensional position information has been registered and a feature included in the captured image, the position/orientation information indicating a position and an orientation of the image sensing device; a registration unit configured to register three-dimensional position information of an unregistered feature included in the captured image on the basis of the position/orientation information; and a notification unit configured to notify a user of a progress of the registration of the three-dimensional position information of the unregistered feature executed by the registration unit.

Further features of the present invention will become apparent from the following description of exemplary embodiments (with reference to the attached drawings).

DESCRIPTION OF THE EMBODIMENTS

The following describes embodiments of the present invention with reference to the attached drawings. Note that the embodiments described below are examples of specific embodiments of the present invention, and serve as specific working examples of the configurations described in the claims.

[First Embodiment]

In the present embodiment, a description is given of an example of an information processing apparatus that is configured in the following manner. Position/orientation information indicating the position and orientation of an image sensing device is estimated on the basis of three-dimensional position information of a registered feature and a feature in a frame image captured by the image sensing device, three-dimensional position information of an unregistered feature is generated on the basis of the estimated position/orientation information, and the generated three-dimensional position information is registered. The generation and registration of the three-dimensional position information of the unregistered feature are controlled in accordance with execution of the estimation.

Figure 1:
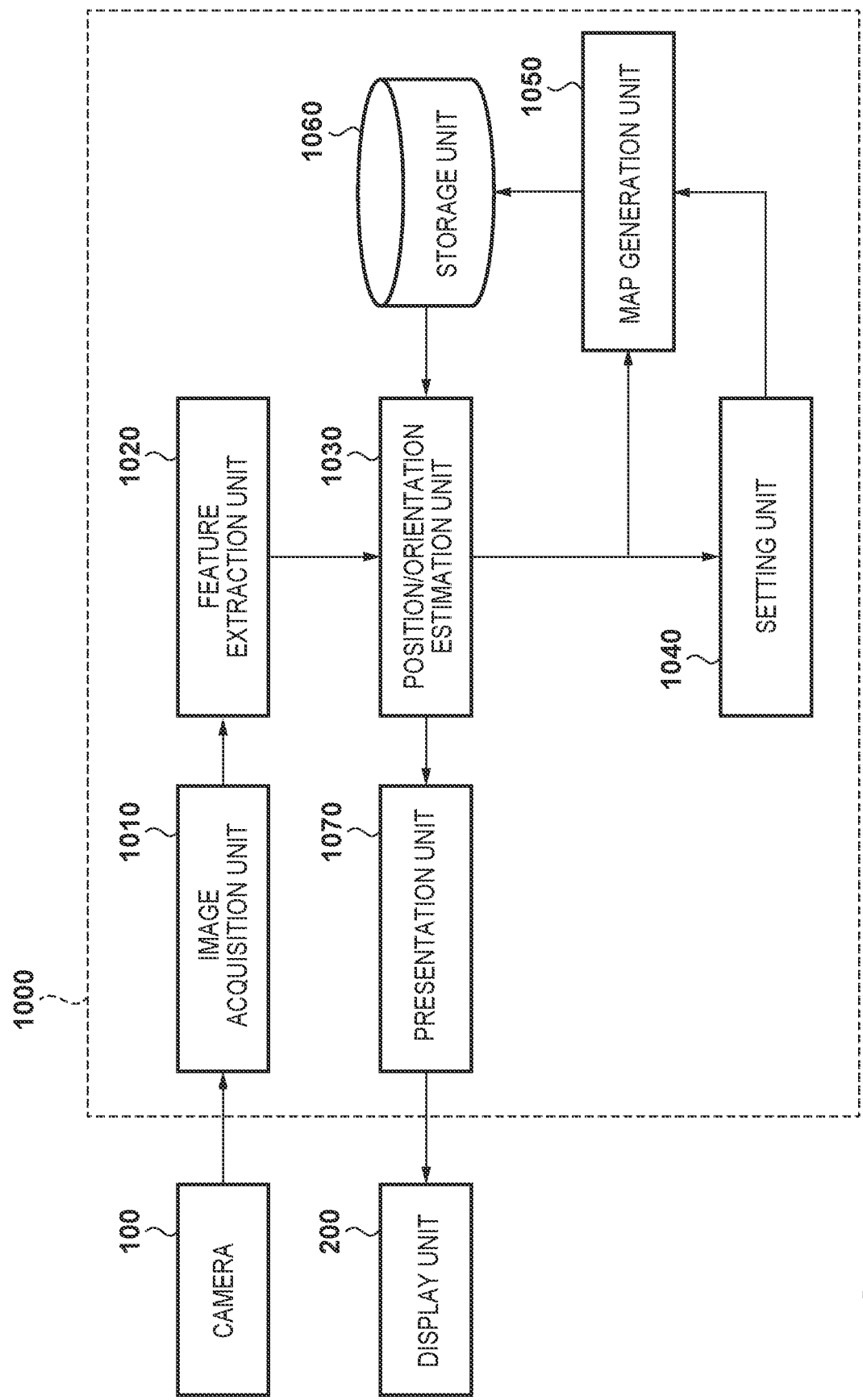
FIG. 1 is a block diagram of an exemplary configuration of a system.

First, an exemplary configuration of a system including the information processing apparatus according to the present embodiment will be described using a block diagram of FIG. 1. As shown in FIG. 1, the system according to the present embodiment includes a camera 100, a display unit 200, and an information processing apparatus 1000.

The camera 100 will now be described. The camera 100 is a stereo camera that captures a video of a physical space, and sequentially transmits images of frames (frame images) that compose the captured video to a subsequent information processing apparatus 1000. The camera 100 may be a stereo camera mounted on an HMD, or a stereo camera mounted on a mobile terminal apparatus, such as a smartphone and a tablet terminal apparatus; it is not limited to being embodied in a particular manner. Furthermore, the position and orientation of the camera 100 are estimated in the following processing, and the estimated position and orientation are based on a world coordinate system. The world coordinate system is a coordinate system in which one point in the physical space serves as the origin, and three axes that are orthogonal to one another at the origin are used as an X-axis, a Y-axis, and a Z-axis. Note that the world coordinate system is not limited to being defined in a particular manner. For example, the world coordinate system may be defined on the basis of a plurality of features whose positions in the physical space are known. Alternatively, the world coordinate system may be defined on the basis of the position and orientation that the camera 100 takes when performing image capture for the first time. Furthermore, the positions of vertices that compose indices placed in the physical space may be known. The scale may be determined on the basis of features and indices with known positions. Alternatively, the scale of the world coordinate system may be determined on the basis of known positions at which image capture has been performed. The position and orientation of the camera 100 are not limited to being expressed in a particular manner. Hereinafter, it will be assumed that internal parameters of the camera 100, such as a skew correction coefficient, a focal length, and the positions of principal points, have been corrected using well-known methods.

The display unit 200 will now be described. The display unit 200 is constituted by, for example, a CRT screen or a liquid crystal screen, and displays images and characters output from the information processing apparatus 1000. Note that the display unit 200 may be a display screen mounted on an HMD, or may be a display screen mounted on a mobile terminal apparatus, such as a smartphone and a tablet terminal apparatus; it is not limited to being embodied in a particular manner.

The information processing apparatus 1000 will now be described.

An image acquisition unit 1010 acquires frame images that are sequentially transmitted from the camera 100, and transmits the acquired frame images to a subsequent feature extraction unit 1020. When the camera 100 performs analog output compliant with NTSC and the like, the image acquisition unit 1010 is realized by an analog video capture board. On the other hand, when the camera 100 performs digital output compliant with the IEEE 1394 and the like, the image acquisition unit 1010 is realized by, for example, an IEEE 1394 interface board. Note that the image acquisition unit 1010 is not limited to acquiring frame images from the camera 100; for example, it may read out a set of frame images that have been captured by the camera 100 and stored in a storage apparatus, such as a hard disk, in advance. A set of frame images mentioned in the present embodiment may be frames that compose a video, or may be a set of still images that have been captured consecutively.

The feature extraction unit 1020 extracts feature points from the frame images transmitted from the image acquisition unit 1010. For example, the feature points may be pixel regions with luminance values that are different from luminance values of nearby pixel regions by a threshold or more, or may be such image features as corners of a desk and window frames (natural features).

A position/orientation estimation unit 1030 estimates the position and orientation of the camera 100 using maps, which include three-dimensional position information of feature points or depth information indicating the depths from the camera 100 to feature points, and the feature points extracted by the feature extraction unit 1020. The maps include, for example, the positions serving as three-dimensional information of feature points or depth information indicating the depths from the camera 100 to feature points, image patches around feature points in the frame images (the image patches are sets of pixels, e.g., 5×5 pixel regions), and the positions and orientations of the camera 100 at the time of image capture. Note that techniques to estimate the position and orientation of the camera 100 using information that is equivalent to the aforementioned maps and feature points in images are widely known.

A setting unit 1040 sets the length of a period in which a map generation unit 1050 generates the maps, or a map generation period. The map generation period may be a preset period, or may be a period that is set as appropriate via a non-illustrated console unit operated by a user.

The map generation unit 1050 generates the maps only during the map generation period set by the setting unit 1040 (except for an initial map), and stores the generated maps to a storage unit 1060.

A presentation unit 1070 transmits, to the display unit 200, information indicating the map generation period set by the setting unit 1040, the remainder of the map generation period, an elapsed period between the start of the map generation and the current time, and the like.

Figure 2:
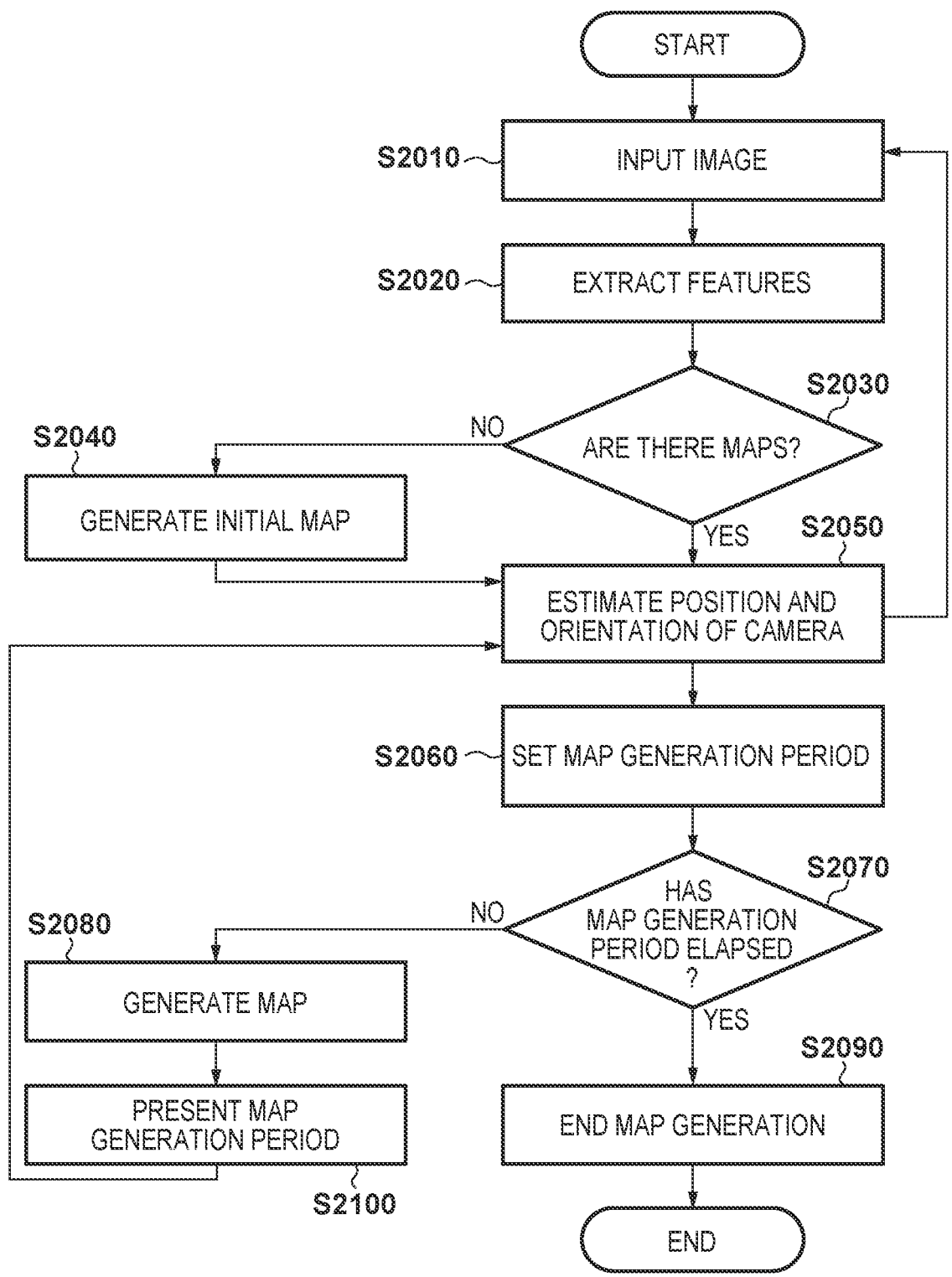
FIG. 2 is a flowchart of processing executed by an information processing apparatus 1000.

The following describes processing executed by the information processing apparatus 1000 using FIG. 2, which is a flowchart of this processing.

<Step S2010>

The image acquisition unit 1010 transfers, to the subsequent feature extraction unit 1020, frame images that have been sequentially output from the camera 100, one frame at a time.

<Step S2020>

The feature extraction unit 1020 extracts feature points from each frame image received from the image acquisition unit 1010. A description is now given of an example of processing for extracting feature points from a frame image. It will be assumed herein that, in a frame image, a feature point is a point where a luminance gradient exhibited by nearby pixels is equal to or larger than a threshold. Specifically, a luminance gradient is shown at a point where the difference between the darknesses of neighboring pixels in an image is equal to or larger than a threshold. A luminance gradient is detected using, for example, a well-known edge detection operator, such as the Sobel operator and the Prewitt operator. The edge detection operator is applied in the horizontal direction and the vertical direction of an image on a pixel-by-pixel basis. Then, edge intensities are calculated on the basis of output values of the edge detection operator. Provided that an output value of the edge detection operator for the horizontal direction is fx and an output value of the edge detection operator for the vertical direction is fy, an edge intensity I of a pixel to which the edge detection operator is applied is calculated using the following expression.

$$I = \sqrt{(fx^2 + fy^2)}$$

<Step S2030>

The position/orientation estimation unit 1030 determines whether maps have been generated. If it is determined that maps have not been generated yet, the present processing proceeds to step S2040 to generate the first map, that is to say, an initial map. On the other hand, if maps have already been generated (if at least the initial map has been generated), the present processing proceeds to step S2050.

<Step S2040>

The map generation unit 1050 generates a map (initial map) from the frame image acquired by the image acquisition unit 1010. The initial map can be estimated by, for example, associating the in-image coordinates of feature points extracted from a plurality of images. For example, the features of images that have been captured in chronological order from different positions are tracked using the KLT feature tracker method, and feature points of the plurality of images are associated. A transformation matrix called the essential matrix (E matrix) is estimated from correspondence of the feature points in the images, the position and orientation of the camera are obtained from the E matrix, and three-dimensional information indicating the positions or depths of the feature points are estimated using a stereo method on the basis of the relative positions and orientations for the plurality of images. The following items are stored in maps: three-dimensional positions of sets of feature points, or depth information indicating the depths of the sets of feature points from various positions of image capture performed by the camera; image patches around the feature points; and the positions and orientations of the camera at the various positions of image capture. Note that a map generation method and the types of information included in maps are not limited to those mentioned above. In the present embodiment, frame images that are used in the estimation of three-dimensional information of feature points are referred to as keyframes.

<Step S2050>

The position/orientation estimation unit 1030 estimates the position and orientation of the camera 100 using the feature points that the feature extraction unit 1020 extracted from the frame image in step S2020, as well as maps stored in the storage unit 1060. In this estimation, feature points shown by the maps are projected onto the frame image, and the position and orientation of the camera 100 are calculated repeatedly so as to minimize the differences between the projected feature points and the feature points that the feature extraction unit 1020 extracted from the frame image. As this technique is widely known, a more detailed description of this technique will be omitted.

Any well-known method may be used to estimate the position and orientation of the camera on the basis of maps, as long as the method estimates the position and orientation of the camera from the extracted feature points, as with the methods described in Non-Patent Literature 1 and Non-Patent Literature 2.

As described above, the processes of steps S2010 to S2050 are intended to estimate the position and orientation of the camera 100, and the estimated position and orientation are used as the "position and orientation of a virtual viewpoint" in generating an image of a virtual space in the case of, for example, MR. In MR, an image of the virtual space is generated on the basis of the position and orientation of the virtual viewpoint, and the generated image of the virtual space and an image of a physical space are composited to be presented to the user. Therefore, the virtual viewpoint needs to track the movement of the user's viewpoint in real time, that is to say, these estimation processes need to be executed in real time. For this reason, the processes of steps S2010 to S2050 are executed repeatedly each time a frame image is input.

On the other hand, the later-described processes of steps S2060 to S2100 are intended to generate maps from keyframes, as will be described later. After the process of step S2050 is executed for the first time, the processes of steps S2060 to S2100 are executed in parallel with the processes of steps S2010 to S2050. Therefore, in the flowchart of FIG. 2, after the process of step S2050, the present processing returns to step S2010 and proceeds to step S2060 at the same time.

<Step S2060>

The setting unit 1040 sets a period that has been preset for generating maps (excluding the initial map) as a map generation period, and starts counting time (upon the start of the processes for estimating the position and orientation of the camera 100). Note that once the time counting has been started, the map generation period is not set in the present step.

<Step S2070>

The setting unit 1040 determines whether the map generation period has elapsed since the start of time counting in step S2060. If it is determined that the map generation period has elapsed since the start of time counting, the present processing proceeds to step S2090; if it is determined that the map generation period has not elapsed since the start of time counting, the present processing proceeds to step S2080.

<Step S2080>

The map generation unit 1050 determines whether the difference between the position/orientation of the camera 100 that was estimated in step S2050 and the position/orientation of the camera 100 that was estimated in the previous step S2050 is equal to or larger than a threshold. If it is determined that the difference between position components is equal to or larger than the threshold, and/or that the difference between orientation components is equal to or larger than the threshold, the frame image that the image acquisition unit 1010 acquired in step S2010 is registered with the storage unit 1060 as a keyframe. When the number of keyframes registered with the storage unit 1060 hits or exceeds a prescribed number, the map generation unit 1050 performs epipolar search for pixel patches around the feature points on the basis of the position and orientation of the camera 100, and performs stereo matching of the feature points in the plurality of keyframes. Then, the map generation unit 1050 calculates the three-dimensional positions or the depth values of the feature points on the basis of the result of stereo matching. Thereafter, the map generation unit 1050 additionally registers a map including the following set of items with the storage unit 1060: the calculated three-dimensional positions or depth values of the feature points; the pixel patches; and the position and orientation of the camera. This newly-registered map is used in estimating the position and orientation of the camera 100 for the next and subsequent frames.

Note that whether the frame image that the image acquisition unit 1010 acquired in step S2010 is a keyframe is not limited to being determined using the aforementioned method, and may be determined using various methods.

<Step S2090>

The setting unit 1040 instructs the map generation unit 1050 to stop the map generation, and thus the map generation unit 1050 ends the map generation processes. Therefore, the map generation is performed only during the map generation period after the estimation of the position and orientation of the camera 100 was started. After the map generation has been ended, in the flowchart of FIG. 2, the processes of steps S2010 to S2050 are executed repeatedly, and the processes of steps S2060 to S2100 are not executed.

<Step S2100>

Figure 3:
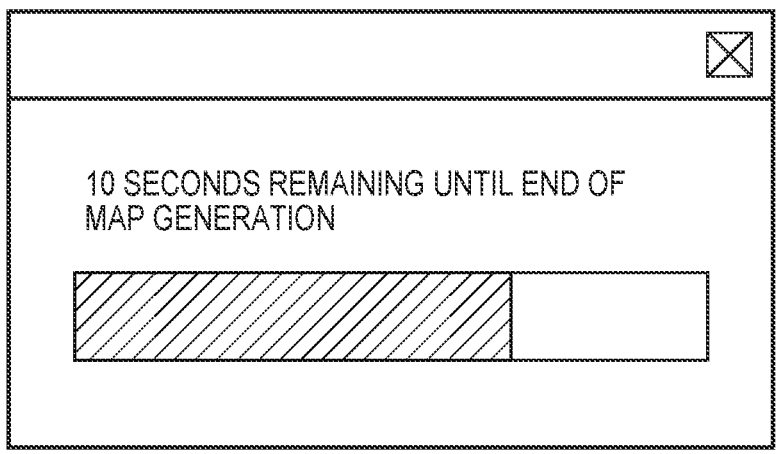
FIG. 3 shows an example of a window that is displayed to give notice of the progress of map generation.

The presentation unit 1070 transmits, to the display unit 200, information indicating the progress of the current map generation, such as an elapsed period since the start of the map generation and the remainder of the map generation period; in response, the display unit 200 displays the transmitted progress. For example, as shown in FIG. 3, the display unit 200 displays a window for giving notice of a remaining period until the end of the map generation (in FIG. 3, the remaining period is 10 seconds) with the use of character information and a progress bar. Alternatively, the user may be notified of the progress of the current map generation using sound. That is to say, there are various methods of notifying the user of the progress of the current map generation, and any of these methods may be used.

As described above, in the present embodiment, the map generation is performed only during a prescribed period in response to the start of estimation of the position and orientation of the camera 100, and after the map generation has been ended, the position and orientation of the camera 100 are estimated on the basis of the maps that have been generated by then. This configuration prevents continuous map generation, thereby avoiding overflow, which occurs when the upper limit of a memory is reached, and a drop in a frame rate caused by an increased processing load associated with an increase in the amount of information used in calculation.

Furthermore, a period required for the map generation can be automatically set without specialized knowledge in techniques to estimate the position and orientation of the camera, e.g., how long to perform the map generation and when to end the map generation. This lessens a burden on the user, thereby enabling the user to experience mixed reality with ease.

The following describes exemplary modifications of the present embodiment. Note that exemplary modifications 1-1 and 1-2 according to the present embodiment will be described with a focus on differences from the first embodiment, and it will be assumed that these exemplary modifications are similar to the first embodiment unless particularly mentioned.

<Exemplary Modification 1-1>

In the first embodiment, the map generation is ended when the map generation period has elapsed since the start of time counting; however, a condition for ending the map generation is not limited to this. In the present exemplary modification, after the time counting is started, a continuous period T in which a map is neither generated nor additionally registered may be separately measured, and the map generation may be ended when the continuous period T exceeds a threshold.

Figure 4:
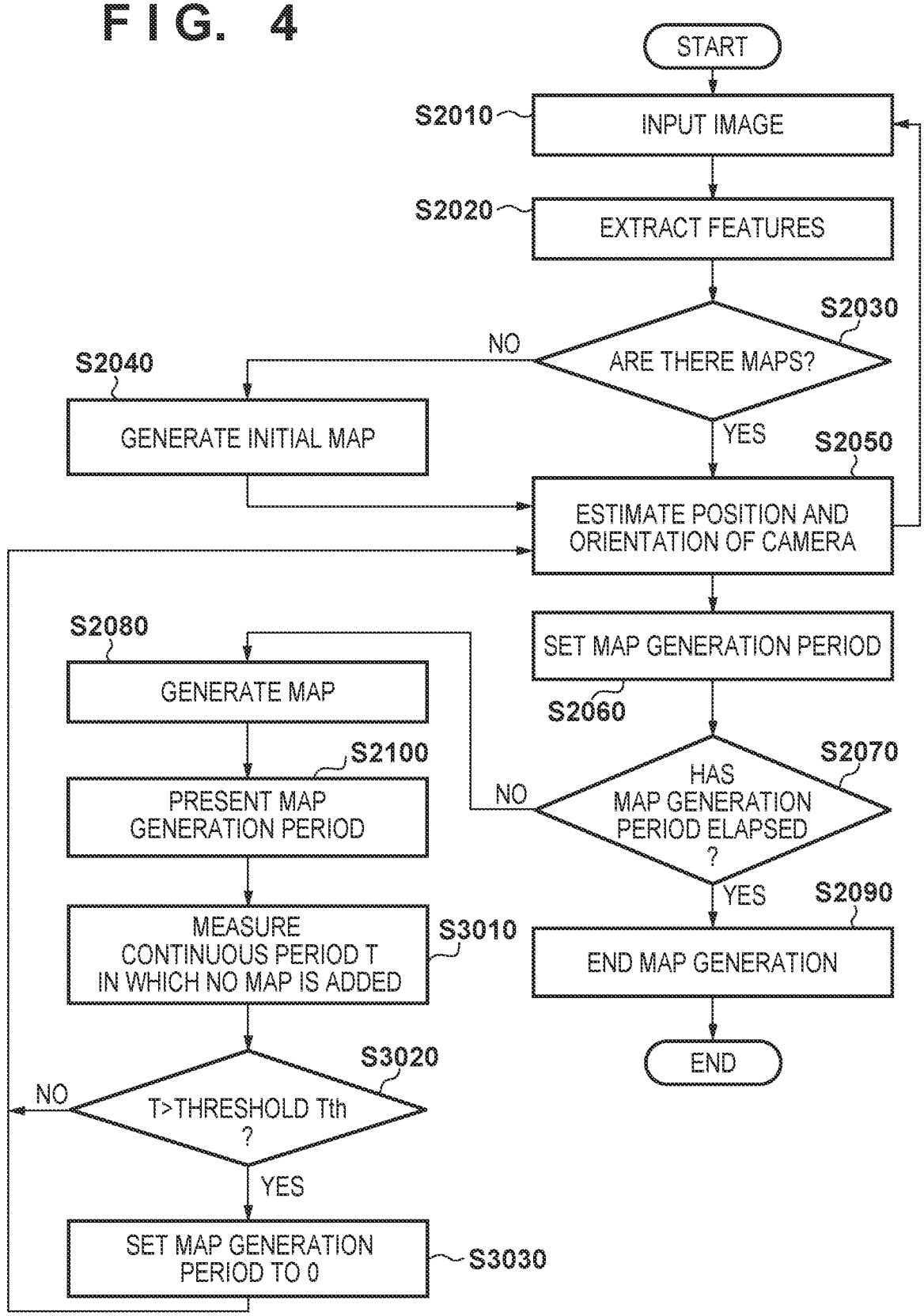
FIG. 4 is a flowchart of processing executed by the information processing apparatus 1000.

The operations of the information processing apparatus according to the present exemplary modification will now be described using a flowchart of FIG. 4. In the flowchart of FIG. 4, process steps that are the same as process steps shown in FIG. 2 will be given the same step numbers thereas, and a description thereof will be omitted.

<Step S3010>

The setting unit 1040 measures the continuous period T in which a map is neither generated nor additionally registered.

<Step S3020>

The setting unit 1040 determines whether the continuous period T has exceeded a threshold Tth. The threshold Tth may be set to, for example, 60 seconds. If it is determined that the continuous period T has exceeded the threshold Tth, the present processing proceeds to step S3030; if it is determined that the continuous period T does not exceed the threshold Tth, the present processing proceeds to step S2050. The continuous period T exceeds the threshold Tth when, for example, a map generation condition is not satisfied because registration of the next keyframe takes too long.

<Step S3030>

The setting unit 1040 re-sets the map generation period to 0. Thereafter, the present processing returns to step S2050, but no processing is executed in step S2060, and step S2070 is followed by step S2090 because the map generation period is 0; therefore, the map generation is ended.

As described above, in the present embodiment, the map generation can be automatically stopped when, for example, a new map is no longer added because sufficient maps have been generated. Therefore, the user does not need to consider when to stop the map generation. This is an easy-to-use feature for users who do not have previous knowledge. Furthermore, the processing load can be reduced as there is no need to continue the map generation, which requires a large processing load.

<Exemplary Modification 1-2>

In the exemplary modification 1-1, the continuous period T in which no new map is added is measured, and when the continuous period T has exceeded the threshold Tth, the map generation is stopped by setting the map generation period to 0. It should be noted that a map is newly added when the position and orientation have been changed along with the user's movement. Therefore, when the user is remaining still without making any movement, there is a possibility that the map generation is stopped without generating a sufficient number of maps. In cases like this, the map generation need not be stopped.

Figure 5:
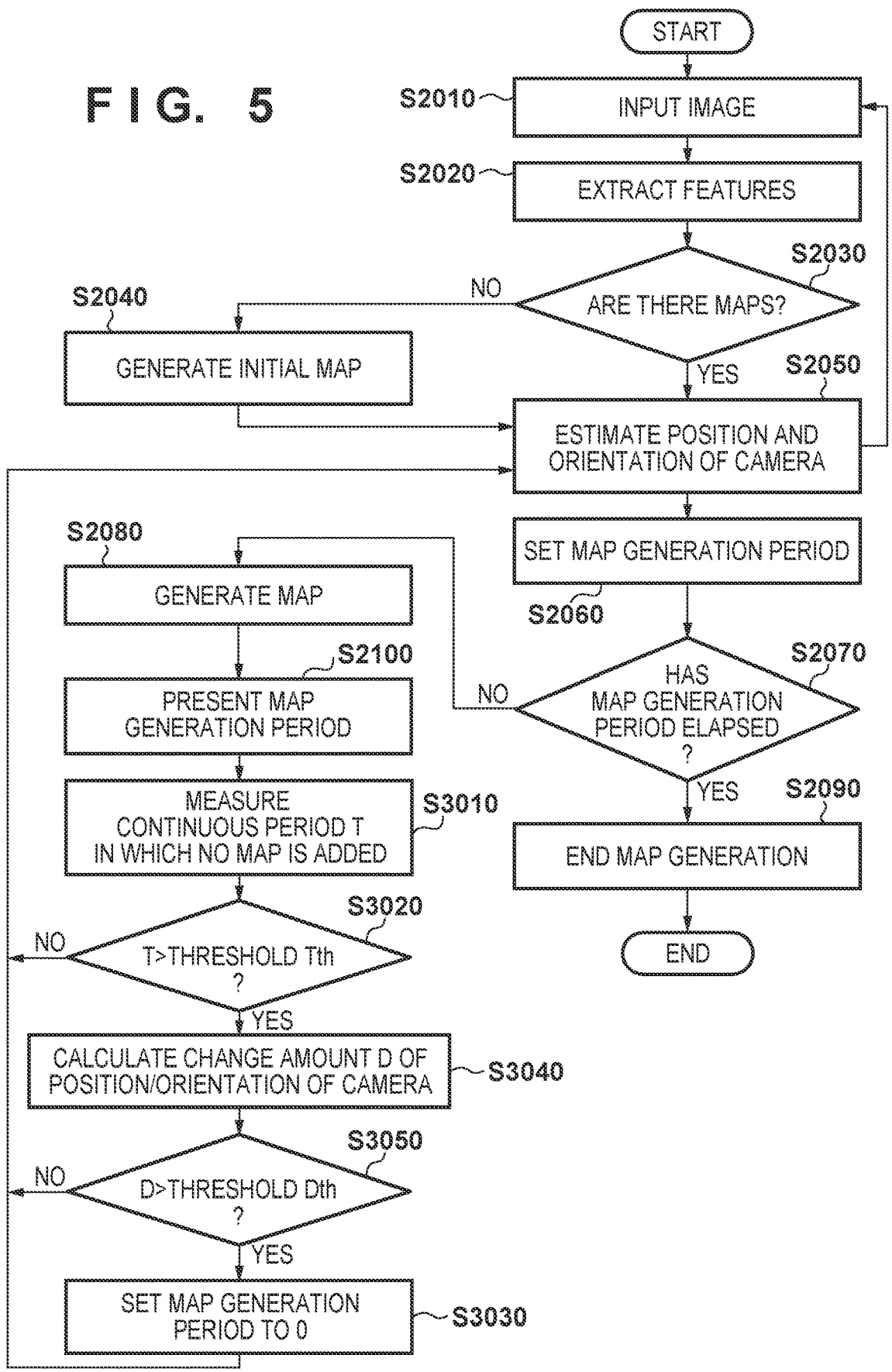
FIG. 5 is a flowchart of processing executed by the information processing apparatus 1000.

In view of this, the present exemplary modification adopts the configuration of the exemplary modification 1-1, and further determines whether to stop the map generation using the result of determining whether the user is remaining still without making any movement. The operations of the information processing apparatus according to the present exemplary modification will now be described using a flowchart of FIG. 5. In the flowchart of FIG. 5, process steps that are the same as process steps shown in FIG. 4 will be given the same step numbers thereas, and a description thereof will be omitted.

If the continuous period T has exceeded the threshold Tth in step S3020, the present processing proceeds to step S3040; if the continuous period T does not exceed the threshold Tth, the present processing proceeds to step S2050.

<Step S3040>

The position/orientation estimation unit 1030 obtains the difference (absolute value) between the position (orientation) that was estimated for a previous (old) frame and the position (orientation) that was estimated for the current frame, and obtains a cumulative sum of such differences as a change amount D. The change amount D may be obtained only for position components, may be obtained only for orientation components, or may be obtained for both of them.

<Step S3050>

The position/orientation estimation unit 1030 determines whether the change amount D obtained in step S3040 exceeds a threshold Dth. If it is determined that the change amount D exceeds the threshold Dth, the present processing proceeds to step S3030; if it is determined that the change amount D does not exceed the threshold Dth, the present processing returns to step S2050.

Even when a new map has no longer been added, the foregoing processes determine that the user is not making any movement and do not automatically stop the map generation on the condition that the change amount of the position (orientation) of the camera 100 is small. On the other hand, when a new map has no longer been added even though the position (orientation) of the camera 100 has changed by an amount larger than a predetermined change amount, the foregoing processes stop the map generation.

Therefore, the user does not need to consider when to stop the map generation. This is an easy-to-use feature for users who do not have previous knowledge. Furthermore, the processing load can be reduced as there is no need to continue the map generation, which requires a large processing load.

[Second Embodiment]

According to the method used in the first embodiment, the estimation of the position and orientation of the camera and the map generation are performed in parallel, and upon receiving the estimated position and orientation of the camera as input, the map generation period is set, and time counting and map generation are started. When the map generation period has elapsed since the start of time counting, the map generation is ended. However, the map generation period is not limited to being set using this method. For example, when the user experiences mixed reality in a wide range, it is necessary to generate a large number of maps, and hence the map generation period needs to be longer than when the user experiences mixed reality in a small range. As such, the necessary map generation period usually varies on a case-by-case basis; therefore, if one prescribed type of map generation period is set as in the first embodiment, there may be cases in which maps cannot be generated for some ranges due to the failure to generate sufficient maps. It is thus desirable to generate maps in accordance with a range in which the user experiences mixed reality. In view of this, the present embodiment uses a method in which the estimation of the position and orientation of the camera and the map generation are performed in parallel, and a map generation period is set on the basis of a movement distance of the camera. The following description will be given with a focus on differences from the first embodiment, and it will be assumed that the present embodiment is similar to the first embodiment unless particularly mentioned in the following description.

Figure 6:
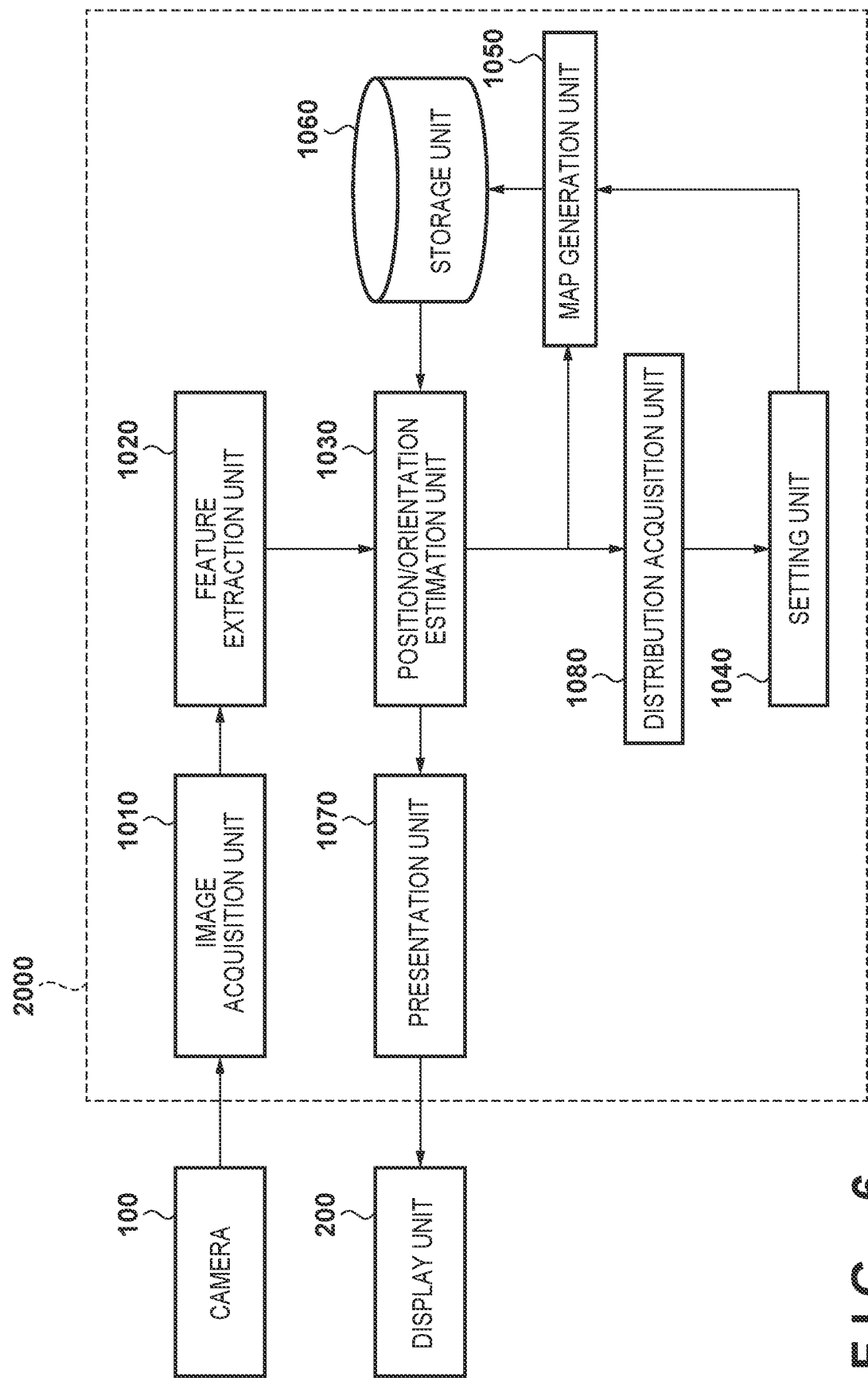
FIG. 6 is a block diagram of an exemplary configuration of a system.

First, an exemplary configuration of an information processing apparatus according to the present embodiment will be described using a block diagram of FIG. 6. In FIG. 6, functional components that are the same as functional components shown in FIG. 1 will be given the same reference numbers thereas, and a description thereof will be omitted. An information processing apparatus 2000 is configured similarly to the information processing apparatus 1000, except that it includes a distribution acquisition unit 1080.

The distribution acquisition unit 1080 obtains a distance (movement distance) between the current position of a camera 100 (the position that was estimated by a position/orientation estimation unit 1030 most recently) and the initial position of the camera 100 (the position that has been measured or acquired in advance and registered with a storage unit 1060).

A setting unit 1040 sets a map generation period in accordance with the movement distance obtained by the distribution acquisition unit 1080.

Figure 7:
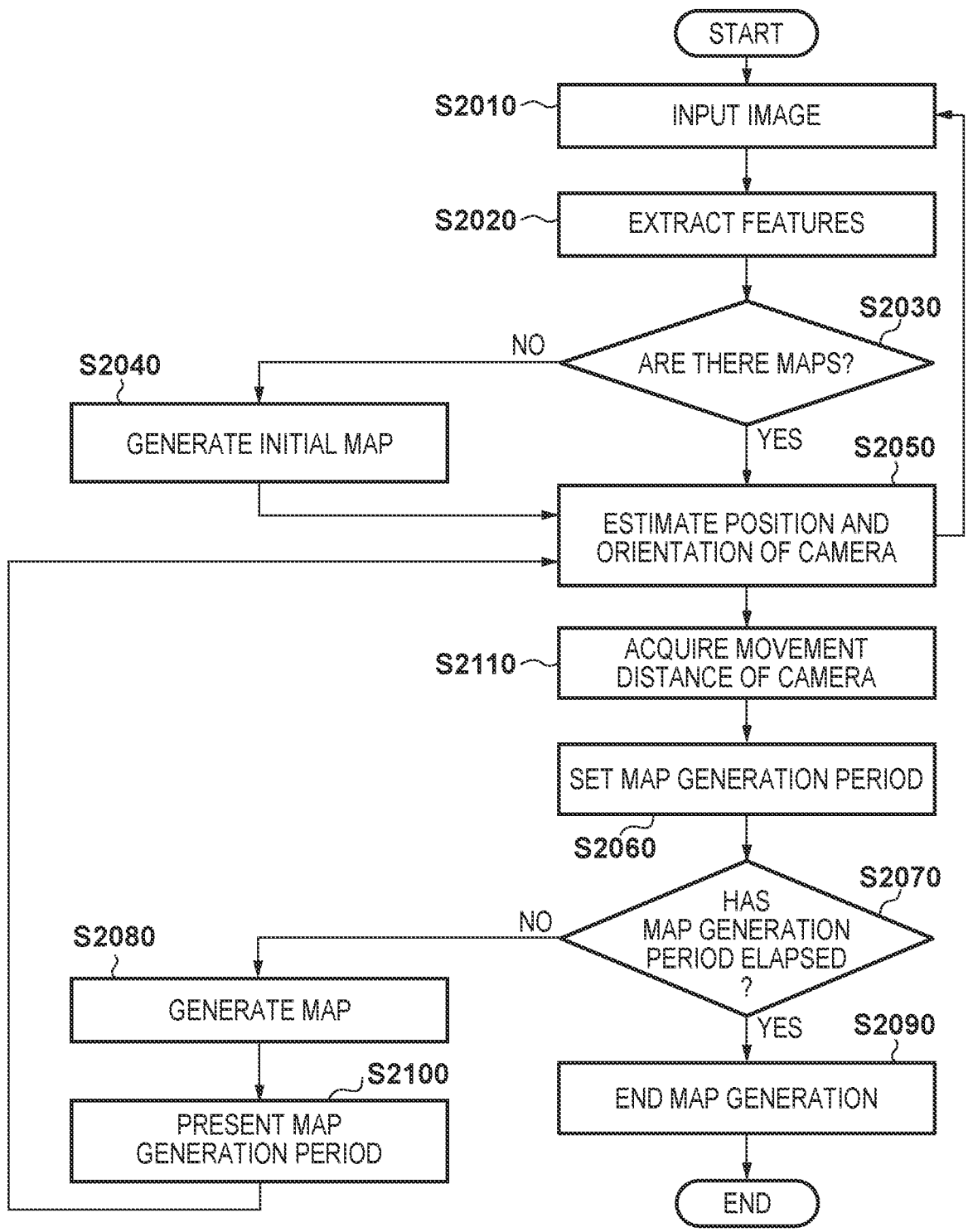
FIG. 7 is a flowchart of processing executed by an information processing apparatus 2000.

The operations of the information processing apparatus 2000 will now be described using a flowchart of FIG. 7. Note that in the flowchart of FIG. 7, process steps that are the same as process steps shown in FIG. 2 will be given the same step numbers thereas, and a description thereof will be omitted.

<Step S2110>

The distribution acquisition unit 1080 obtains a distance (movement distance) between the position that was estimated by the position/orientation estimation unit 1030 most recently and the initial position of the camera 100. Note that the movement distance is not limited to being obtained in this way; for example, a movement path from the initial position of the camera 100 may be obtained using a GPS and the like, and the distance of the movement path may be obtained as the movement distance.

In step S2060, similarly to the first embodiment, the map generation period is set upon the start of processes for estimating the position and orientation of the camera 100; note that when this step is executed for the first time, a preset period is set as the map generation period, similarly to the first embodiment. When this step is executed for the second time onward, the map generation period is set in accordance with the movement distance obtained in step S2110.

For example, provided that a threshold is 3 m and an additional map generation period is 60 seconds, the currently-set map generation period is updated by adding 60 seconds to the currently-set map generation period when the movement distance from the initial position of the camera 100 has exceeded 3 m. Thereafter, as the camera 100 moves, the currently-set map generation period is updated by further adding 60 seconds to the currently-set map generation period when the movement distance from the initial position of the camera 100 has exceeded 6 m. As described above, as the distance from the initial position increases, it is determined that the movement covers a larger space, and a longer map generation period is set. So long as this tendency is reflected in updating the map generation period, a method and timings of updating the map generation period are not limited to the aforementioned examples.

The foregoing processes can adjust the map generation period in accordance with the movement distance of the camera 100, that is to say, the size of the space covered by the movement, thereby generating maps in accordance with a movement range of the camera.

Furthermore, a period required for the map generation can be automatically set without specialized knowledge in techniques to estimate the position and orientation of the camera, e.g., how long to perform the map generation and when to stop the map generation. This lessens a burden on the user, thereby enabling the user to experience mixed reality with ease.

The following describes exemplary modifications of the present embodiment. Note that exemplary modifications 2-1 and 2-2 according to the present embodiment will be described with a focus on differences from the second embodiment, and it will be assumed that these exemplary modifications are similar to the second embodiment unless particularly mentioned.

<Exemplary Modification 2-1>

In the second embodiment, the map generation period is extended as the movement distance of the camera 100 increases; however, the map generation period is not limited to being extended in this manner. In the present exemplary modification, the map generation period is extended in accordance with the number of keyframes registered with the storage unit 1060.

Figure 8:
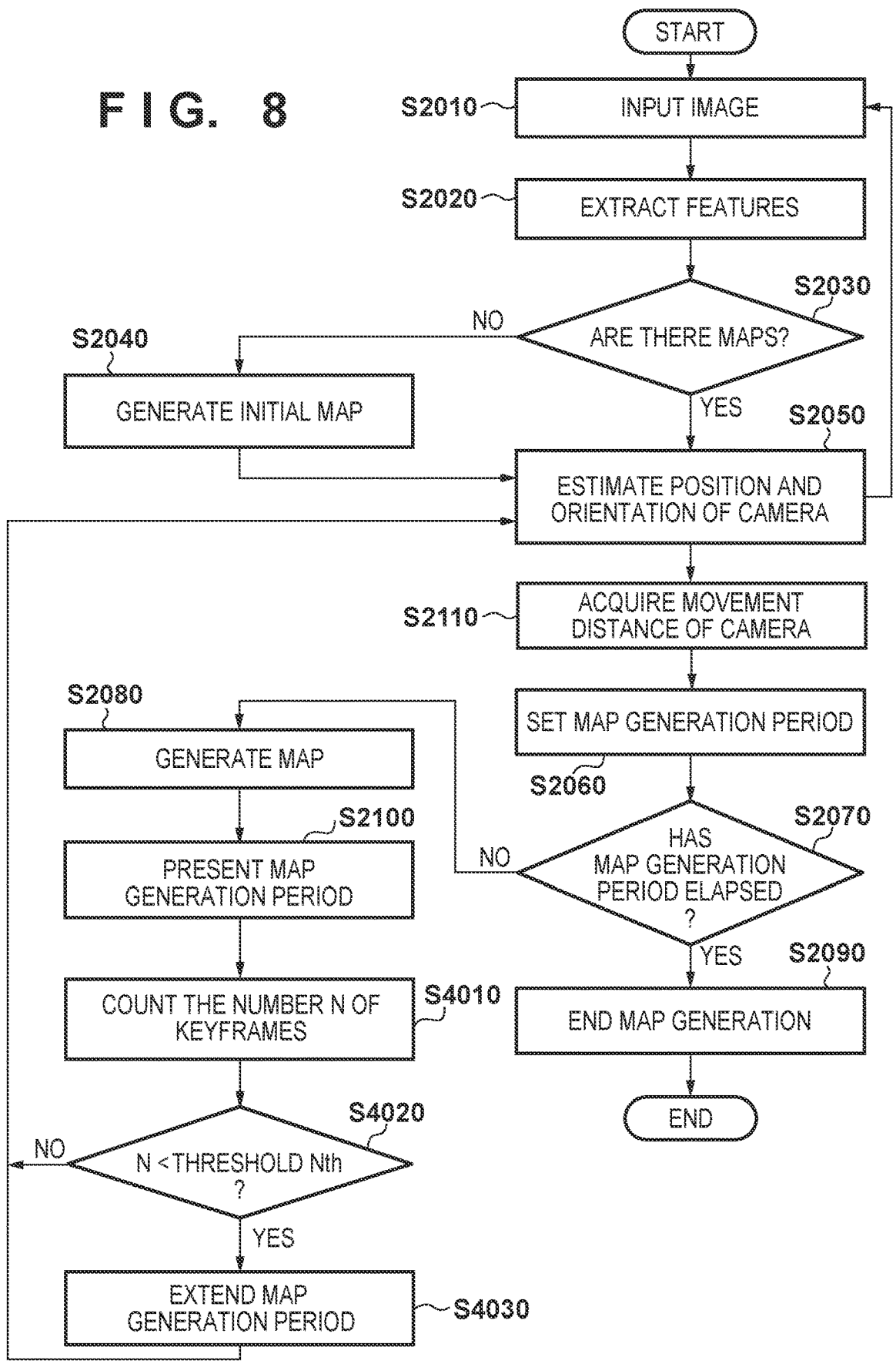
FIG. 8 is a flowchart of processing executed by the information processing apparatus 2000.

The operations of the information processing apparatus according to the present exemplary modification will now be described using a flowchart of FIG. 8. Note that in the flowchart of FIG. 8, process steps that are the same as process steps shown in FIG. 7 will be given the same step numbers thereas, and a description thereof will be omitted.

<Step S4010>

The distribution acquisition unit 1080 counts the number N of keyframes that have been registered with the storage unit 1060.

<Step S4020>

The distribution acquisition unit 1080 determines whether the number N of keyframes counted in step S4010 is smaller than a threshold Nth. If it is determined that the number N of keyframes is smaller than the threshold Nth, the present processing proceeds to step S4030; if it is determined that the number N of keyframes is equal to or larger than the threshold Nth, the present processing proceeds to step S2050.

The threshold Nth is determined on the basis of a change amount that yields 50% of an overlap of the angle of view of the camera 100. For example, in order to cover 360 degrees horizontally with a camera having a horizontal angle of view of 60 degrees, it is sufficient to have 12 keyframes, and thus the threshold Nth can be set to 12. However, the threshold Nth is not limited to being determined in this way, and it may be obtained from the number of keyframes that ensures sufficient precision through experiments, or may be obtained using any well-known method.

<Step S4030>

The setting unit 1040 extends the currently-set map generation period. The currently-set map generation period may be extended by any value, e.g., a prescribed value or a value corresponding to the number N of keyframes.

When it is determined that the number of registered keyframes is small, the foregoing processes extend the map generation period, thereby avoiding inaccurate estimation of the position and orientation of the camera caused by insufficient map generation.

<Exemplary Modification 2-2>

In the second embodiment, the movement distance of the camera 100 is obtained, and the map generation period is adjusted in accordance with the obtained movement distance. However, when a movable range of the camera 100 is known in advance, the user may input the movable range by operating a non-illustrated console unit, and the setting unit 1040 may set a map generation period corresponding to the input movable range.

For example, when the user has input "3 m×3 m floor" as the movement range of the camera 100 by operating the non-illustrated console unit, the setting unit 1040 sets 60 seconds as a map generation period corresponding to the input movement range. On the other hand, when the user has input "6 m×6 m floor" as the movement range of the camera 100 by operating the non-illustrated console unit, the setting unit 1040 sets 360 seconds as a map generation period corresponding to the input movement range. In this case, map generation periods are preregistered with the storage unit 1060 in correspondence with movement ranges, and the setting unit 1040 can acquire a map generation period corresponding to a movement range input by the user from the storage unit 1060. When the map generation period corresponding to the movement range input by the user is not registered, it may be obtained by performing interpolation using a registered map generation period corresponding to a movement range that is close to the input movement range.

[Third Embodiment]

When the precision of the estimated position and orientation of a camera has decreased due to erroneous detection of feature points and erroneous correspondence derived from matching, the precision of generated maps will decrease if the maps are continuously generated on the basis of such low-precision position and orientation of the camera. As the precision of maps decreases, the precision of estimation of the position and orientation of the camera further decreases.

In view of this, in the present embodiment, map generation is stopped by temporarily setting a map generation period to 0 seconds when the stability of the position and orientation of the camera is low, and a predetermined map generation period is set when the stability of the position and orientation of the camera is high. The following description will be given with a focus on differences from the first embodiment, and it will be assumed that the present embodiment is similar to the first embodiment unless particularly mentioned in the following description.

Figure 9:
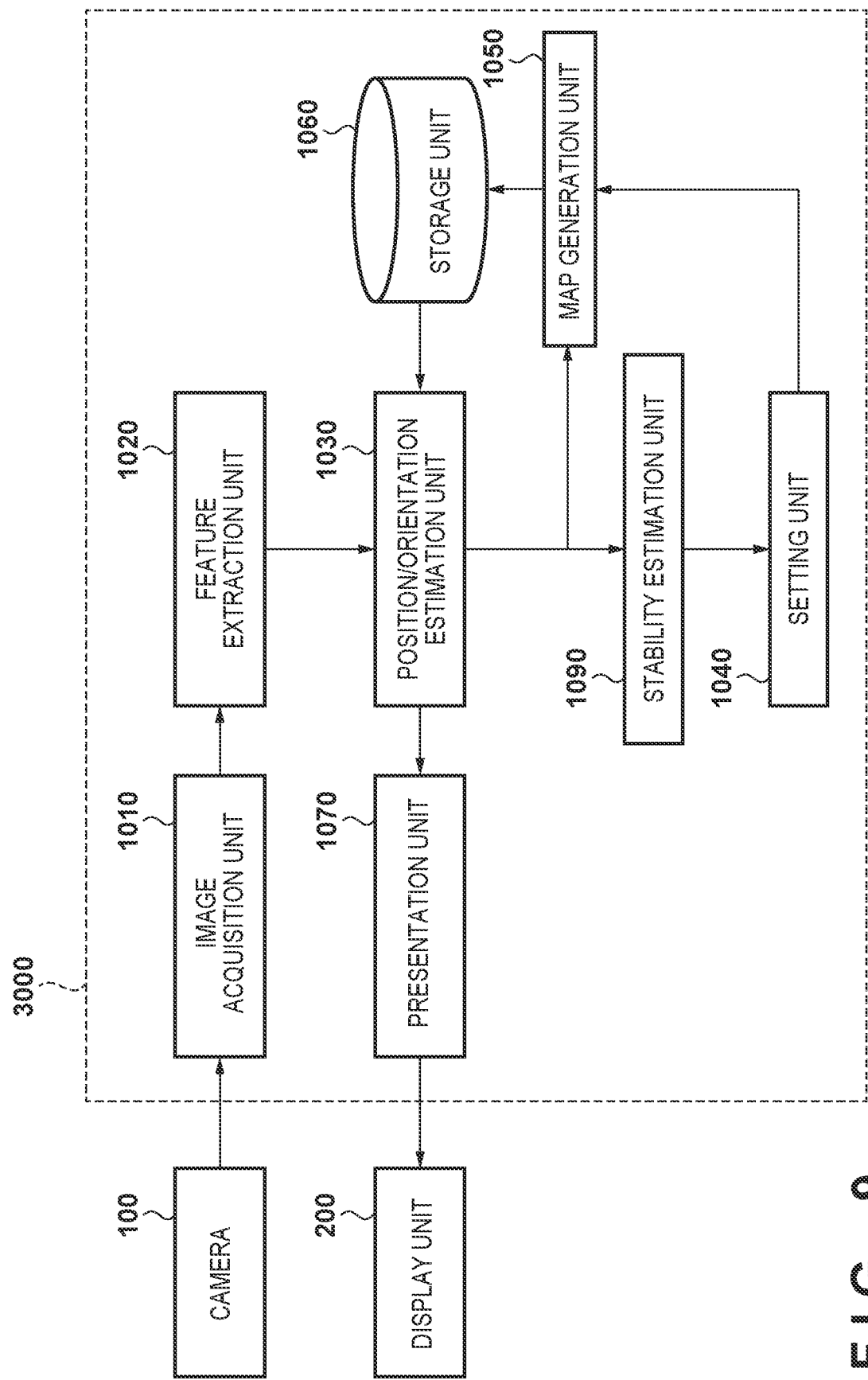
FIG. 9 is a block diagram of an exemplary configuration of a system.

First, an exemplary configuration of an information processing apparatus according to the present embodiment will be described using a block diagram of FIG. 9. In FIG. 9, functional components that are the same as functional components shown in FIG. 1 will be given the same reference numbers thereas, and a description thereof will be omitted. An information processing apparatus 3000 of FIG. 9 is similar to the information processing apparatus 1000, except that it includes a stability estimation unit 1090.

The stability estimation unit 1090 estimates the stability of the position and orientation estimated by a position/orientation estimation unit 1030. The stability of the position and orientation is estimated on the basis of a change amount of the position and/or orientation of a camera 100 for frame images that are obtained in chronological order. When the change amount is larger than a threshold, low stability is set, whereas when the change amount is small, high stability is set. In optimization calculation for estimating the position and orientation of the camera, when re-projection errors are minimized as error functions, dispersion of re-projection errors of detected feature points may be used. When luminance values around feature points are minimized, dispersion of luminance values may be used. The stability of the position and orientation of the camera may be obtained using any well-known method.

Figure 10:
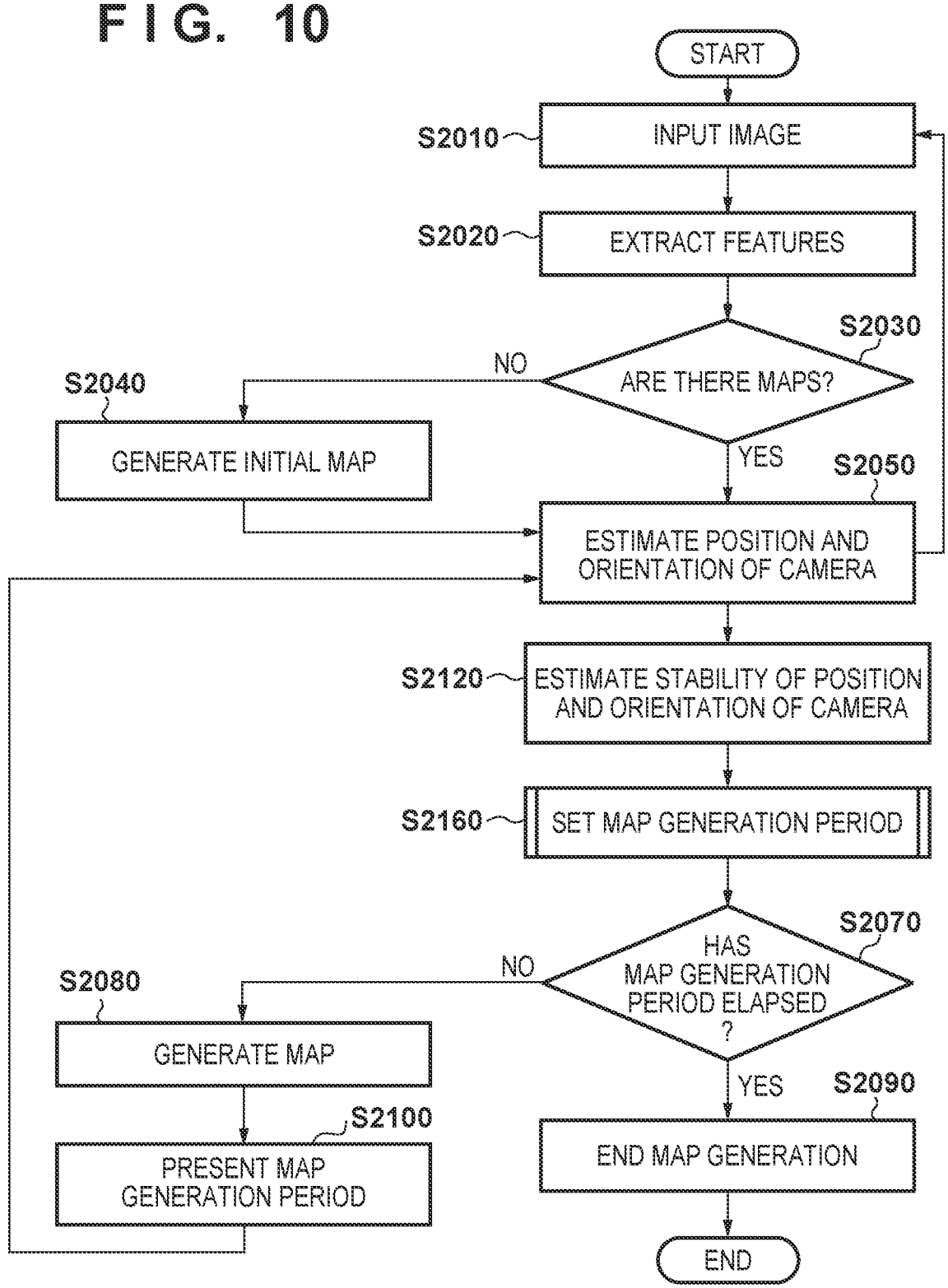
FIG. 10 is a flowchart of processing executed by an information processing apparatus 3000.

The operations of the information processing apparatus 3000 will now be described using a flowchart of FIG. 10. Note that in the flowchart of FIG. 10, process steps that are the same as process steps shown in FIG. 2 will be given the same step numbers thereas, and a description thereof will be omitted.

<Step S2120>

The stability estimation unit 1090 estimates the stability of the position and orientation estimated by the position/orientation estimation unit 1030. When the difference between the image capture positions or the image capture orientations for consecutive frame images that are input in chronological order is larger than a predetermined distance or orientation change amount, low stability is set because there is a possibility that the estimation of the position and orientation of the camera has failed.

<Step S2160>

Figure 11:
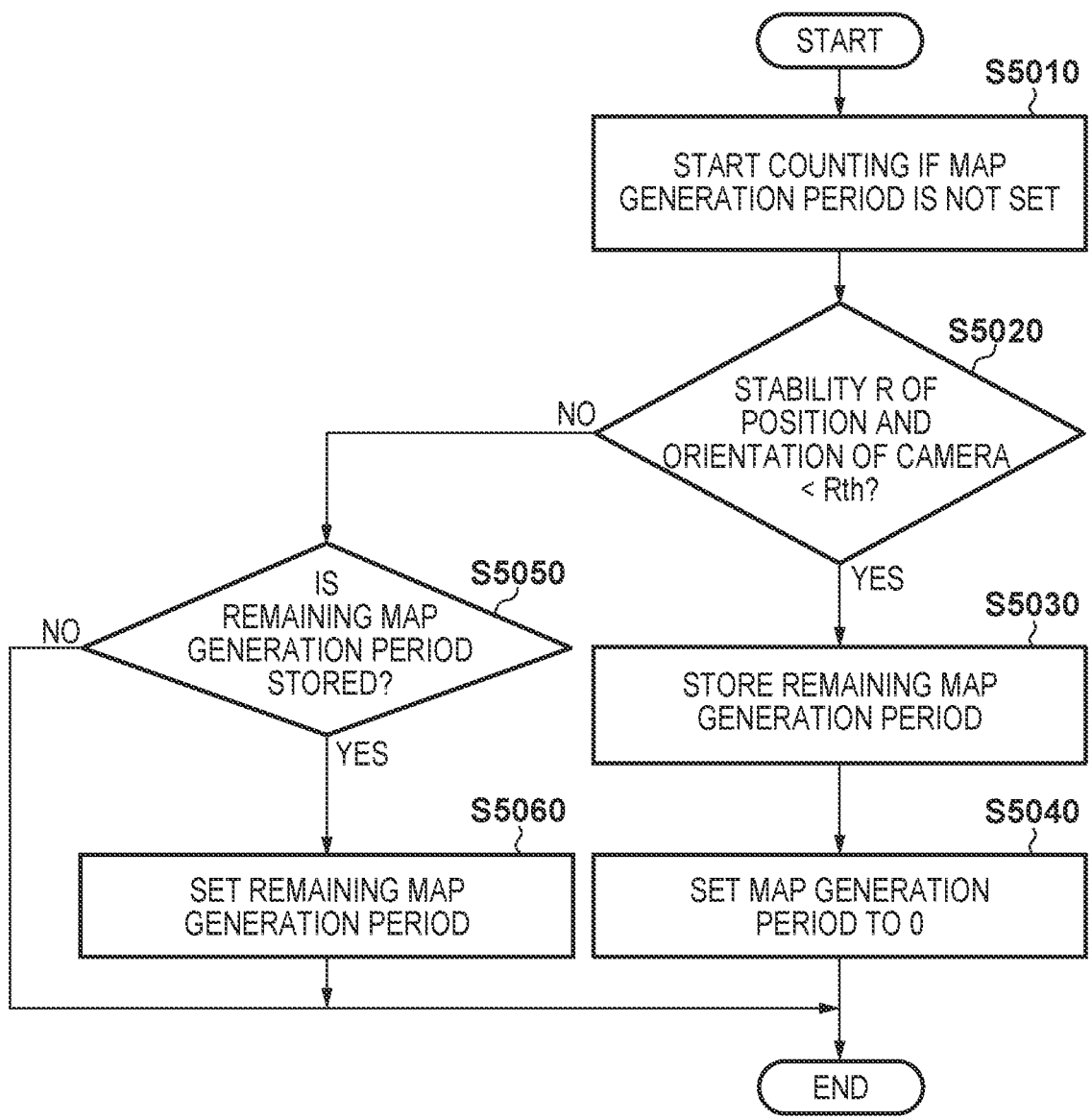
FIG. 11 is a detailed flowchart of the process of step S2160.

A setting unit 1040 sets a map generation period in accordance with the stability estimated in step S2120. A description is now given of the details of the process of step S2160 using a flowchart of FIG. 11.

<Step S5010>

The setting unit 1040 sets a period that has been preset for generating maps (excluding an initial map) as a map generation period, and starts counting time (upon the start of processes for estimating the position and orientation of the camera 100). Note that once the time counting has been started, the map generation period is not set in the present step.

<Step S5020>

The setting unit 1040 determines whether the stability R that was estimated in step S2120 is smaller than a threshold Rth. If it is determined that the stability R is smaller than the threshold Rth, the present processing proceeds to step S5030; if it is determined that the stability R is equal to or larger than the threshold Rth, the present processing proceeds to step S5050.

<Step S5030>

The setting unit 1040 obtains a remaining period by subtracting an elapsed period since the start of time counting in step S5010 from the map generation period, that is to say, obtains the remainder of the map generation period, and stores the obtained remaining period to a storage unit 1060.

<Step S5040>

The setting unit 1040 re-sets the map generation period to 0. Thereafter, the present processing proceeds to step S2070. Step S2070 is followed by step S2090 as the map generation period is 0; as a result, the map generation is ended.

<Step S5050>

The setting unit 1040 determines whether the storage unit 1060 stores the "remaining period," which is stored in step S5030. If it is determined that the "remaining period" is stored in the storage unit 1060, the present processing proceeds to step S5060; if it is determined that the "remaining period" is not stored, the present processing proceeds to step S2070.

<Step S5060>

The setting unit 1040 sets the "remaining period" stored in the storage unit 1060 as the map generation period.

The foregoing processes can perform the map generation only when the stability of the position and orientation of the camera is high, thereby avoiding a decrease in the precision of maps and performing the map generation with high precision.

The following describes exemplary modifications of the present embodiment. Note that exemplary modifications 3-1 and 3-2 according to the present embodiment will be described with a focus on differences from the third embodiment, and it will be assumed that these exemplary modifications are similar to the third embodiment unless particularly mentioned.

<Exemplary Modification 3-1>

Although stopping and resuming of the map generation are controlled in accordance with the stability of the position and orientation of the camera 100 in the third embodiment, resuming of the map generation can be controlled using other methods. In the present exemplary modification, after the map generation is ended with the elapse of the map generation period, the map generation is resumed.

When using a method in which feature points of maps are projected onto an image captured at the current image capture position and the position and orientation of the camera are estimated so as to minimize errors between detected feature points and the projected feature points, the map generation may be resumed when the number of the projected feature points is small. Whether the number of the projected feature points is larger than a threshold may be determined, and when the number of the projected feature points is small, the map generation may be resumed by setting a preset period as the map generation period. When the number of the projected feature points is small, the number of registered feature points is small, and hence it is desirable to generate additional maps.

With the foregoing configuration, after the map generation is ended, the map generation can be automatically resumed without specialized knowledge in techniques to estimate the position and orientation of the camera. This lessens a burden on the user, thereby enabling the user to experience mixed reality with ease.

<Exemplary Modification 3-2>

The exemplary modification 3-1 has introduced the method of resuming the map generation in accordance with the number of feature points that are used in the estimation of the position and orientation of the camera. In the present exemplary modification, a method of starting the map generation will be described.

The map generation may be started upon detection of a known index. The map generation may be started when the number of frames throughout which the known index has been continuously detected hits or exceeds a threshold. After the map generation is ended, the map generation may be resumed upon detection of a preregistered, identifiable index.

Figure 12:
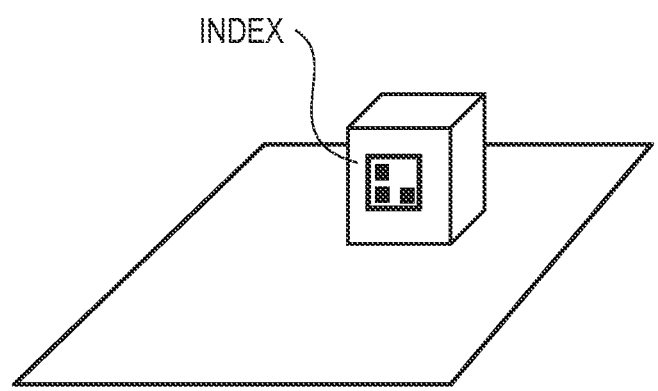
FIG. 12 shows an example of an index.

A description is now given of an index. As shown in FIG. 12, it will be assumed that a pattern representing an identifier is present inside an index having a quadrilateral shape (hereinafter referred to as a quadrilateral index), and the quadrilateral index can be uniquely identified. After binarization processing is applied to a captured image, labeling processing is executed, and regions formed by four straight lines are extracted as candidate regions from among regions of a certain area or more. The index is detected from the acquired image as follows: whether the candidate regions are index regions are determined by determining whether a specific pattern is present inside the candidate regions, and the direction of the index within the image and the identifier are acquired by reading out the pattern.

Figure 13:
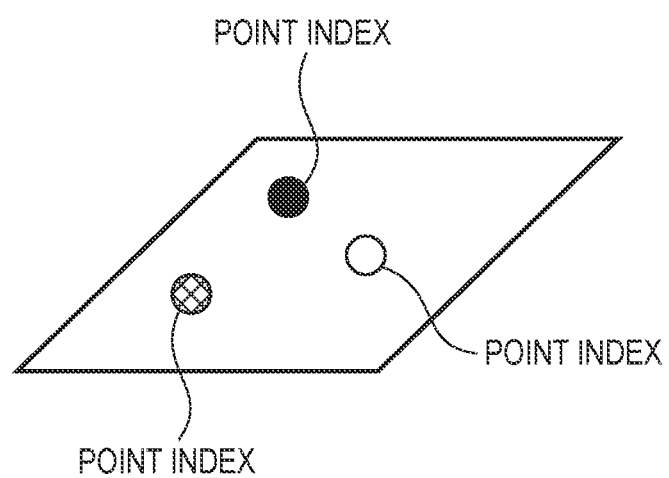
FIG. 13 shows examples of indices.

Note that the index is not limited to the quadrilateral index, and may be in any form as long as the index can be detected from a captured image and the index can be identified. For example, as shown in FIG. 13, point indices that have a circular shape and are different from one another in color may be used. In this case, regions corresponding to the colors of the indices are detected from an image, and the positions of the centers of mass thereof are used as the detection coordinates of the indices. Feature points (natural feature points) that are different from one other in texture may be used as point indices. In this case, the indices are extracted from an image by applying template matching to the image using template images that have been prestored as known information for the indices. The index (indices) is not limited to the foregoing, and may be any index (indices) as long as it is fixed within a space and can be detected from a captured image showing the index (indices).

As described above, the start of the map generation can be determined by detecting an identifiable index (indices). The map generation can be automatically started or resumed simply by detecting the index (indices) without specialized knowledge in techniques to estimate the position and orientation of the camera. This lessens a burden on the user, thereby enabling the user to experience mixed reality with ease.

[Fourth Embodiment]

Figure 14:
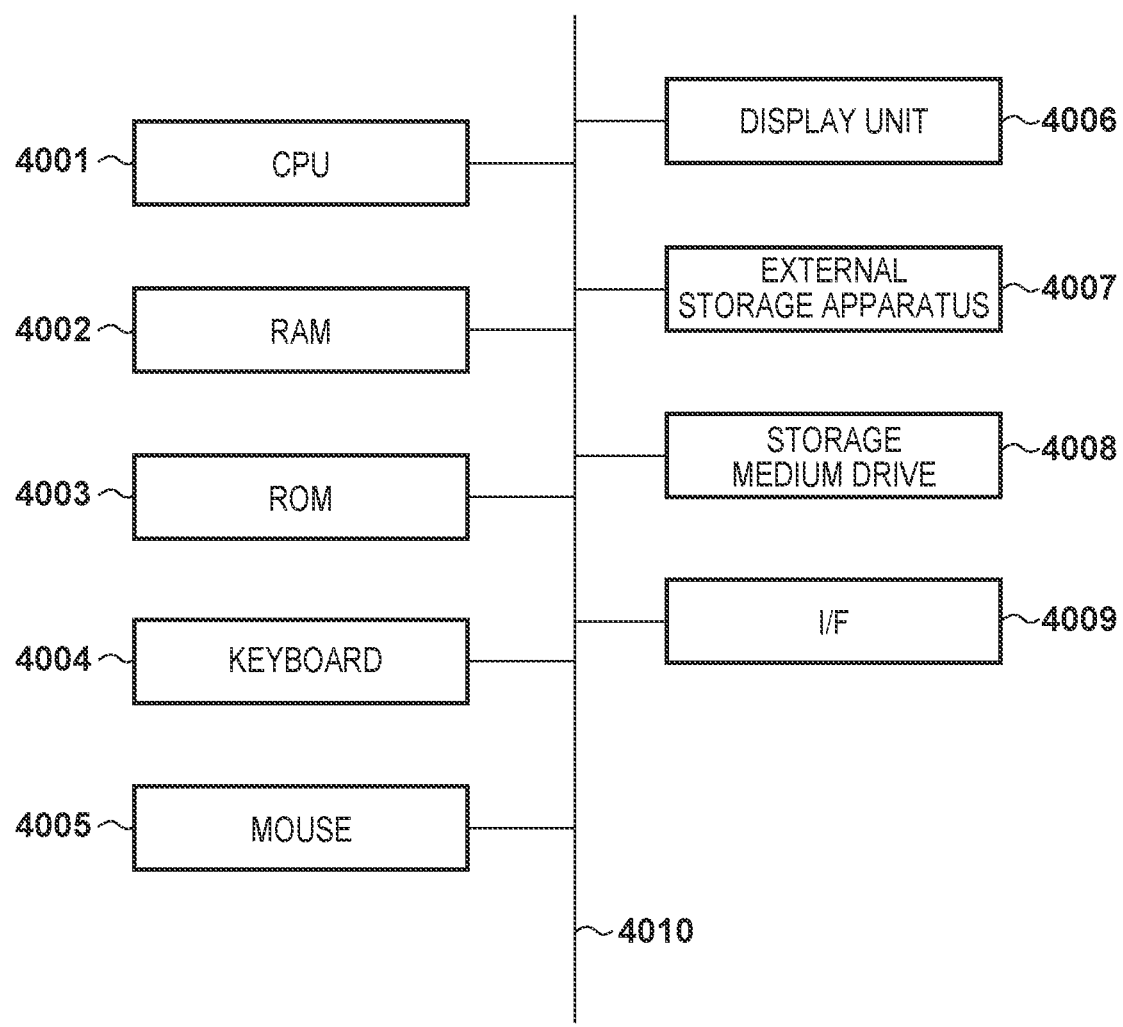
FIG. 14 is a block diagram of an exemplary hardware configuration of a computer apparatus.

The functional components shown in FIGS. 1, 6, and 9 may be constituted by hardware items, or alternatively, the image acquisition unit 1010 and the storage unit 1060 may be constituted by hardware items and at least one of the remaining functional components may be constituted by a software item(s). In this case, a computer apparatus that includes the image acquisition unit 1010 and the storage unit 1060 as hardware items and a processing unit that can execute the software item(s) can be used as the information processing apparatus 1000, 2000, or 3000. A description is now given of an exemplary hardware configuration of the computer apparatus that can be used as the information processing apparatuses 1000, 2000, or 3000 using a block diagram of FIG. 14.

A CPU 4001 executes processing with the use of computer programs and data stored in a RAM 4002 and a ROM 4003. In this way, the CPU 4001 controls the operations of the entire computer apparatus, and executes or controls the above-described processing executed by the information processing apparatus 1000, 2000, or 3000.

The RAM 4002 has an area for storing computer programs and data loaded from an external storage apparatus 4007 and a storage medium drive 4008, and data received from the outside via an interface (I/F) 4009. The RAM 4002 also has a working area that is used by the CPU 4001 in executing various types of processing. As such, the RAM 4002 can provide various types of areas as appropriate. Note that the RAM 4002 can be used as the aforementioned storage unit 1060.

The ROM 4003 stores, for example, setting data for the computer apparatus, which need not be rewritten, and a boot program.

A keyboard 4004 and a mouse 4005 are examples of user interfaces that are operated by the user to input various types of instructions to the CPU 4001. A display unit 4006 is constituted by, for example, a CRT screen or a liquid crystal screen, and can display the results of processing executed by the CPU 4001 as images, characters, and the like. Note that a touchscreen may be provided in place of the keyboard 4004, the mouse 4005, and the display unit 200.

The external storage apparatus 4007 is a large-capacity information storage apparatus, a representative example of which is a hard disk drive apparatus. The external storage apparatus 4007 stores an operating system (OS), as well as computer programs and data for causing the CPU 4001 to execute the operations of the functional components shown in FIGS. 1, 6, and 9 except for the image acquisition unit 1010 and the storage unit 1060. This data includes information that has been explained as known information, such as the aforementioned thresholds. The computer programs and data stored in the external storage apparatus 4007 are loaded to the RAM 4002 as appropriate under control of the CPU 4001 to be processed by the CPU 4001. Note that the external storage apparatus 4007 can be used as the aforementioned storage unit 1060.

The storage medium drive 4008 is an apparatus that can read/write the computer programs and data from/to a storage medium, such as a CD-ROM and a DVD-ROM, and the computer programs and data that have been read out are output to the RAM 4002 and the external storage apparatus 4007. Note that a part or all of the computer programs and data, which have been explained as being stored in the external storage apparatus 4007, may be recorded in this storage medium.

The I/F 4009 functions as an interface for connecting the computer apparatus to a network and external devices, and includes, for example, the functions of the aforementioned image acquisition unit 1010. In the cases of FIGS. 1, 6, and 9, the I/F 4009 is composed of, for example, an analog video port or a digital input/output port compliant with the IEEE 1394 and the like for connecting the camera 100, and a DVI port for outputting various types of information to the display unit 200.

The CPU 4001, RAM 4002, ROM 4003, keyboard 4004, mouse 4005, display unit 4006, external storage apparatus 4007, storage medium drive 4008, and I/F 4009 are all connected to a bus 4010.

Note that the aforementioned embodiments and exemplary modifications may be combined for use as appropriate, in part or in whole, or may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-228094, filed Nov. 20, 2015, which is hereby incorporated by reference herein in its entirety.

What is claimed is:

1. An information processing apparatus, comprising:
   at least one processor; and
   a memory including instructions stored thereon that, when executed by the at least one processor, cause the information processing apparatus to:
   execute, for each of respective frame images output sequentially from an image sensing device, a calculation process for calculating position/orientation information based on three-dimensional position information of a registered feature and a feature in a frame image captured by the image sensing device, the position/orientation information indicating a position and an orientation of the image sensing device;
   generate three-dimensional position information of an unregistered feature based on the calculated position/orientation information, and register the generated three-dimensional position information; and
   set, as a generation period, a period that has been preset for generating the three-dimensional position information of the unregistered feature, wherein
   the generation period, which is currently set, is shortened or extended based on the position/orientation information and an initial position of the image sensing device, and
   the generation and the registration of the three-dimensional position information of the unregistered feature are executed until the currently-set generation period elapses since a start of a first calculation process of the calculated position/orientation information of the image sensing device, and the generation and the registration of the three-dimensional position information of the unregistered feature are stopped when the currently-set generation period has elapsed.

2. The information processing apparatus according to claim 1, wherein
   after the generation and the registration of the three-dimensional position information of the unregistered feature have been started, when a continuous period in which the generation and the registration of the three-dimensional position information of the unregistered feature are not executed has exceeded a threshold, the generation and the registration of the three-dimensional position information of the unregistered feature are stopped.

3. The information processing apparatus according to claim 1, wherein
   after the generation and the registration of the three-dimensional position information of the unregistered feature have been started, even when a continuous period in which the generation and the registration of the three-dimensional position information of the unregistered feature are not executed has exceeded a threshold, the generation and the registration of the three-dimensional position information of the unregistered feature are not stopped on a condition that a change amount between frames of the position and/or the orientation indicated by the calculated position/orientation information does not exceed a threshold.

4. The information processing apparatus according to claim 1, wherein the instructions, when executed by the at least one processor, further cause the information processing apparatus to:
   acquire, as the movement of the image sensing device, a distance from an initial position of the image sensing device,
   wherein the currently-set generation period is shortened or extended in accordance with the movement of the image sensing device.

5. The information processing apparatus according to claim 1, wherein
   the currently-set generation period is shortened or extended in accordance with the number of frame images for which the position or the orientation indicated by the calculated position/orientation information exhibits a change that is equal to or larger than a threshold.

6. The information processing apparatus according to claim 1, wherein
the currently-set generation period is shortened or extended in accordance with a change amount between frames of the calculated position and/or the orientation indicated by the position/orientation information.

7. The information processing apparatus according to claim 1, wherein
the generation and the registration of the three-dimensional position information of the unregistered feature are started in accordance with capturing of an image of an index performed by the image sensing device.

8. The information processing apparatus according to claim 1, wherein
as a keyframe, a frame image is used for which the position indicated by the calculated position/orientation information exhibits a change that is equal to or larger than a threshold, and three-dimensional position information of a feature based on the keyframe and calculated position/orientation information is generated based on the keyframe and a position and an orientation of the image sensing device is indicated.

9. The information processing apparatus according to claim 1, wherein
as a keyframe, a frame image is used for which the orientation indicated by the calculated position/orientation information exhibits a change that is equal to or larger than a threshold, and three-dimensional position information of a feature is generated based on the keyframe and the calculated position/orientation information based on the keyframe and a position and an orientation of the image sensing device is indicated.

10. The information processing apparatus according to claim 1, wherein the instructions, when executed by the at least one processor, further cause the information processing apparatus to:
notify a user of a progress of the generation and the registration of the three-dimensional position information of the unregistered feature.

11. An information processing apparatus, comprising:
at least one processor; and
a memory including instructions stored thereon that, when executed by the at least one processor, cause the information processing apparatus to:
acquire an image captured by an image sensing device;
execute, for each of respective captured images which are acquired, a calculation process for calculating position/orientation information based on a feature whose three-dimensional position information has been registered and a feature included in the captured image, the position/orientation information indicating a position and an orientation of the image sensing device;
generate three-dimensional position information of an unregistered feature included in the captured image based on the calculated position/orientation information and register the generated three-dimensional position information of the unregistered feature;
notify a user of a progress of the executed registration of the three-dimensional position information of the unregistered feature; and
set, as a generation period, a period that has been preset for generating the three-dimensional position information of the unregistered feature, wherein the generation period, which is currently set, is shortened or extended based on the position/orientation information and an initial position of the image sensing device, and
the generation and the registration of the three-dimensional position information of the unregistered feature are executed until the currently-set generation period elapses since a start of first calculation process of the calculated position/orientation information of the image sensing device, and the generation and the registration of the three-dimensional position information of the unregistered feature are stopped when the currently-set generation period has elapsed.

12. An information processing method executed by an information processing apparatus, the information processing method comprising:
executing, for each of respective frame images output sequentially from an image sensing device, a calculation process for calculating position/orientation information based on three-dimensional position information of a registered feature and a feature in a frame image captured by the image sensing device, the position/orientation information indicating a position and an orientation of the image sensing device;
generating three-dimensional position information of an unregistered feature based on the calculated position/orientation information, and registering the generated three-dimensional position information; and
setting, as a generation period, a period that has been preset for generating the three-dimensional position information of the unregistered feature, wherein
the generation period, which is currently set, is shortened or extended based on the position/orientation information and an initial position of the image sensing device, and
the generation and the registration of the three-dimensional position information of the unregistered feature are executed until the currently-set generation period elapses since a start of a first calculation process of the position/orientation information of the image sensing device, and the generation and the registration of the three-dimensional position information of the unregistered feature are stopped when the currently-set generation period has elapsed.

13. An information processing method, comprising:
acquiring an image captured by an image sensing device;
executing, for each of respective captured images which is acquired, a calculating process for calculating position/orientation information based on a feature whose three-dimensional position information has been registered and a feature included in the captured image, the position/orientation information indicating a position and an orientation of the image sensing device;
generating three-dimensional position information of an unregistered feature included in the captured image based on the calculated position/orientation information and registering the generated three-dimensional position information of the unregistered feature;
notifying a user of a progress of the registration of the three-dimensional position information of the unregistered feature; and
setting, as a generation period, a period that has been preset for generating the three-dimensional position information of the unregistered feature, wherein the generation period, which is currently set, is shortened or extended based on the position/orientation information and an initial position of the image sensing device, and the generation and the registration of the three-dimensional position information of the unregistered feature are executed until the currently-set generation period elapses since a start of a first calculation process of the calculated position/orientation information of the image sensing device, and the generation and the registration of the three-dimensional position information of the unregistered feature are stopped when the currently-set generation period has elapsed.

14. A non-transitory computer readable storage medium storing a computer program for causing a computer to:

execute, for each of respective frame images output sequentially from an image sensing device, a calculation process for calculating position/orientation information based on three-dimensional position information of a registered feature and a feature in a frame image captured by the image sensing device, the position/orientation information indicating a position and an orientation of the image sensing device;

generate three-dimensional position information of an unregistered feature based on the calculated position/orientation information, and register the generated three-dimensional position information; and set, as a generation period, a period that has been preset for generating the three-dimensional position information of the unregistered feature, wherein the generation period, which is currently set, is shortened or extended based on the position/orientation information and an initial position of the image sensing device, and the generation and the registration of the three-dimensional position information of the unregistered feature are executed until the currently-set generation period elapses since a start of a first calculation process of the position/orientation information of the image sensing device, and the generation and the registration of the three-dimensional position information of the unregistered feature are stopped when the currently-set generation period has elapsed.

15. A non-transitory computer readable storage medium storing a computer program for causing a computer to:

acquire an image captured by an image sensing device;

execute, for each of respective captured images which are acquired, a calculation process for calculating position/orientation information based on a feature whose three-dimensional position information has been registered and a feature included in the captured image, the position/orientation information indicating a position and an orientation of the image sensing device;

generate three-dimensional position information of an unregistered feature included in the captured image based on the calculated position/orientation information and register the generated three-dimensional position information of the unregistered feature;

notify a user of a progress of the executed registration of the three-dimensional position information of the unregistered feature; and set, as a generation period, a period that has been preset for generating the three-dimensional position information of the unregistered feature, wherein the generation period, which is currently set, is shortened or extended based on the position/orientation information and an initial position of the image sensing device, and the generation and the registration of the three-dimensional position information of the unregistered feature are executed until the currently-set generation period elapses since a start of a first calculation process of the calculated position/orientation information of the image sensing device, and the generation and the registration of the three-dimensional position information of the unregistered feature are stopped when the currently-set generation period has elapsed.

16. The information processing apparatus according to claim 1, wherein the generation and the registration of the three-dimensional position information of the unregistered feature are executed in parallel with the calculation process.

17. An information processing apparatus, comprising:

at least one processor; and a memory including instructions stored thereon that, when executed by the at least one processor, cause the information processing apparatus to:

execute, for frame images output sequentially from an image sensing device, a calculation process for calculating position/orientation information based on three-dimensional position information of a registered feature and a feature in a frame image captured by the image sensing device, the position/orientation information indicating a position and an orientation of the image sensing device;

generate three-dimensional position information of an unregistered feature based on the calculated position/orientation information indicating the position and orientation of the image sensing device, and register the generated three-dimensional position information of the unregistered feature;

set, as a generation period, a period that has been preset for generating the three- dimensional position information of the unregistered feature; and display a progress bar which represents a progress, against the generation period, of the generation and the registration of the three-dimensional position information of the unregistered feature together with text information which represents a remaining time of the generation period, wherein the generation and the registration of the three-dimensional position information of the unregistered feature are executed until the generation period elapses since a start of the calculation process.

18. The information processing apparatus according to claim 17, wherein the instructions stored thereon that, when executed by the at least one processor, cause the information processing apparatus to start counting time upon start of the calculation process, and display the progress bar which represents the progress being based on the counted time that elapses since the start of the calculation process together with the text information which represents the remaining time being based on the counted time that elapses since the start of the calculation process.

19. An information processing method executed by an information processing apparatus, the information processing method comprising:

executing, for frame images output sequentially from an image sensing device, a calculation process for calculating position/orientation information based on three-dimensional position information of a registered feature and a feature in a frame image captured by the image sensing device, the position/orientation information indicating a position and an orientation of the image sensing device;

generating three-dimensional position information of an unregistered feature based on the calculated position/orientation information indicating the position and orientation of the image sensing device, and registering the generated three-dimensional position information of the unregistered feature;

setting, as a generation period, a period that has been preset for generating the three-dimensional position information of the unregistered feature; and displaying a progress bar which represents a progress, against the generation period, of the generation and the registration of the three-dimensional position information of the unregistered feature together with text information which represents a remaining time of the generation period, wherein the generation and the registration of the three-dimensional position information of the unregistered feature are executed until the generation period elapses since a start of the calculation process.

20. The information processing method according to claim 19, wherein the instructions stored thereon that, when executed by the at least one processor, cause the information processing apparatus to start counting time upon start of the calculation process, and display the progress bar which represents the progress being based on the counted time that elapses since the start of the calculation process together with the text information which represents the remaining time being based on the counted time that elapses since the start of the calculation process.

21. A non-transitory computer-readable storage medium storing a computer program for causing a computer to:

execute, for frame images output sequentially from an image sensing device, a calculation process for calculating position/orientation information based on three-dimensional position information of a registered feature and a feature in a frame image captured by the image sensing device, the position/orientation information indicating a position and an orientation of the image sensing device;

generate three-dimensional position information of an unregistered feature based on the calculated position/orientation information indicating the position and orientation of the image sensing device, and register the generated three-dimensional position information of the unregistered feature;

set, as a generation period, a period that has been preset for generating the three- dimensional position information of the unregistered feature; and display a progress bar which represents a progress, against the generation period, of the generation and the registration of the three-dimensional position information of the unregistered feature together with text information which represents a remaining time of the generation period, wherein the generation and the registration of the three-dimensional position information of the unregistered feature are executed until the generation period elapses since a start of the calculation process.

22. The non-transitory computer readable storage medium according to claim 21, wherein the instructions stored thereon that, when executed by the at least one processor, cause the information processing apparatus to start counting time upon start of the calculation process, and display the progress bar which represents the progress being based on the counted time that elapses since the start of the calculation process together with the text information which represents the remaining time being based on the counted time that elapses since the start of the calculation process.

* * * * *